(12) United States Patent
Barnes et al.

(10) Patent No.: US 8,155,275 B1
(45) Date of Patent: Apr. 10, 2012

(54) SYSTEMS AND METHODS FOR MANAGING ALARMS FROM RECORDERS

(75) Inventors: Robert John Barnes, Watford (GB); Rajan Gupta, Alpharetta, GA (US)

(73) Assignee: Verint Americas, Inc., Roswell, GA (US)

( * ) Notice: Subject to any disclaimer, the term of this patent is extended or adjusted under 35 U.S.C. 154(b) by 169 days.

(21) Appl. No.: 11/396,514

(22) Filed: Apr. 3, 2006

(51) Int. Cl.
H04M 1/64 (2006.01)
H04M 3/00 (2006.01)

(52) U.S. Cl. .................. 379/67.1; 379/265.02

(58) Field of Classification Search ............ 379/265.07, 379/88.02, 265.06, 67.1, 265.02
See application file for complete search history.

(56) References Cited

U.S. PATENT DOCUMENTS

| | | |
|---|---|---|
| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,133,081 A | 7/1992 | Mayo |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |

(Continued)

FOREIGN PATENT DOCUMENTS

EP 0453128 A2 10/1991

(Continued)

OTHER PUBLICATIONS

"Customer Spotlight: Navistar International," Web pae, unverified print date of Apr. 1, 2002.

(Continued)

Primary Examiner — Rasha Al Aubaidi
(74) Attorney, Agent, or Firm — McKeon, Meunier, Carlin & Curfman

(57) ABSTRACT

Systems and methods for managing alarms from recorders are provided. An exemplary method comprises the steps of: receiving alarm alerts from one or more recorders by a central application module, the alarm alerts being operative to notify a user of a problem associated with the one or more recorders, storing the alarm alerts in an alarm database, and managing the alarm alerts by the central application module so that a user can view the alarm alerts.

18 Claims, 16 Drawing Sheets

U.S. PATENT DOCUMENTS

| | | | |
|---|---|---|---|
| 5,572,652 A | 11/1996 | Robusto et al. | |
| 5,577,112 A | 11/1996 | Cambray et al. | |
| 5,590,171 A | 12/1996 | Howe et al. | |
| 5,597,312 A | 1/1997 | Bloom et al. | |
| 5,619,183 A | 4/1997 | Ziegra et al. | |
| 5,661,778 A * | 8/1997 | Hall et al. | 379/29.01 |
| 5,696,906 A | 12/1997 | Peters et al. | |
| 5,717,879 A | 2/1998 | Moran et al. | |
| 5,721,842 A | 2/1998 | Beasley et al. | |
| 5,742,670 A | 4/1998 | Bennett | |
| 5,748,499 A | 5/1998 | Trueblood | |
| 5,778,182 A | 7/1998 | Cathey et al. | |
| 5,784,452 A | 7/1998 | Carney | |
| 5,790,798 A | 8/1998 | Beckett, II et al. | |
| 5,796,952 A | 8/1998 | Davis et al. | |
| 5,809,247 A | 9/1998 | Richardson et al. | |
| 5,809,250 A | 9/1998 | Kisor | |
| 5,825,869 A | 10/1998 | Brooks et al. | |
| 5,835,572 A | 11/1998 | Richardson, Jr. et al. | |
| 5,862,330 A | 1/1999 | Anupam et al. | |
| 5,864,772 A | 1/1999 | Alvarado et al. | |
| 5,881,225 A | 3/1999 | Worth | |
| 5,884,032 A | 3/1999 | Bateman et al. | |
| 5,907,680 A | 5/1999 | Nielsen | |
| 5,918,214 A | 6/1999 | Perkowski | |
| 5,923,746 A | 7/1999 | Baker et al. | |
| 5,933,811 A | 8/1999 | Angles et al. | |
| 5,944,791 A | 8/1999 | Scherpbier | |
| 5,948,061 A | 9/1999 | Merriman et al. | |
| 5,958,016 A | 9/1999 | Chang et al. | |
| 5,964,836 A | 10/1999 | Rowe et al. | |
| 5,978,648 A | 11/1999 | George et al. | |
| 5,982,857 A | 11/1999 | Brady | |
| 5,987,466 A | 11/1999 | Greer et al. | |
| 5,990,852 A | 11/1999 | Szamrej | |
| 5,991,373 A | 11/1999 | Pattison et al. | |
| 5,991,796 A | 11/1999 | Anupam et al. | |
| 6,005,932 A | 12/1999 | Bloom | |
| 6,009,429 A | 12/1999 | Greer et al. | |
| 6,014,134 A | 1/2000 | Bell et al. | |
| 6,014,647 A | 1/2000 | Nizzari et al. | |
| 6,014,666 A | 1/2000 | Helland et al. | |
| 6,018,619 A | 1/2000 | Allard et al. | |
| 6,035,332 A | 3/2000 | Ingrassia et al. | |
| 6,038,544 A | 3/2000 | Machin et al. | |
| 6,039,575 A | 3/2000 | L'Allier et al. | |
| 6,057,841 A | 5/2000 | Thurlow et al. | |
| 6,058,163 A | 5/2000 | Pattison et al. | |
| 6,061,798 A | 5/2000 | Coley et al. | |
| 6,072,860 A | 6/2000 | Kek et al. | |
| 6,076,099 A | 6/2000 | Chen et al. | |
| 6,078,894 A | 6/2000 | Clawson et al. | |
| 6,091,712 A | 7/2000 | Pope et al. | |
| 6,108,711 A | 8/2000 | Beck et al. | |
| 6,122,665 A | 9/2000 | Bar et al. | |
| 6,122,668 A | 9/2000 | Teng et al. | |
| 6,130,668 A | 10/2000 | Stein | |
| 6,138,139 A | 10/2000 | Beck et al. | |
| 6,144,991 A | 11/2000 | England | |
| 6,146,148 A | 11/2000 | Stuppy | |
| 6,151,622 A | 11/2000 | Fraenkel et al. | |
| 6,154,771 A | 11/2000 | Rangan et al. | |
| 6,157,808 A | 12/2000 | Hollingsworth | |
| 6,171,109 B1 | 1/2001 | Ohsuga | |
| 6,182,094 B1 | 1/2001 | Humpleman et al. | |
| 6,195,679 B1 | 2/2001 | Bauersfeld et al. | |
| 6,201,948 B1 | 3/2001 | Cook et al. | |
| 6,202,066 B1 | 3/2001 | Barkley et al. | |
| 6,211,451 B1 | 4/2001 | Tohgi et al. | |
| 6,225,993 B1 | 5/2001 | Lindblad et al. | |
| 6,230,197 B1 | 5/2001 | Beck et al. | |
| 6,236,977 B1 | 5/2001 | Verba et al. | |
| 6,244,758 B1 | 6/2001 | Solymar et al. | |
| 6,282,548 B1 | 8/2001 | Burner et al. | |
| 6,286,030 B1 | 9/2001 | Wenig et al. | |
| 6,286,046 B1 | 9/2001 | Bryant | |
| 6,288,753 B1 | 9/2001 | DeNicola et al. | |
| 6,289,340 B1 | 9/2001 | Purnam et al. | |
| 6,301,462 B1 | 10/2001 | Freeman et al. | |
| 6,301,573 B1 | 10/2001 | McIlwaine et al. | |
| 6,324,282 B1 | 11/2001 | McIllwaine et al. | |
| 6,347,374 B1 | 2/2002 | Drake et al. | |
| 6,351,467 B1 | 2/2002 | Dillon | |
| 6,353,851 B1 | 3/2002 | Anupam et al. | |
| 6,360,250 B1 | 3/2002 | Anupam et al. | |
| 6,370,574 B1 | 4/2002 | House et al. | |
| 6,404,857 B1 | 6/2002 | Blair et al. | |
| 6,411,989 B1 | 6/2002 | Anupam et al. | |
| 6,418,471 B1 | 7/2002 | Shelton et al. | |
| 6,459,787 B2 | 10/2002 | McIllwaine et al. | |
| 6,487,195 B1 | 11/2002 | Choung et al. | |
| 6,493,758 B1 | 12/2002 | McLain | |
| 6,502,131 B1 | 12/2002 | Vaid et al. | |
| 6,510,220 B1 | 1/2003 | Beckett, II et al. | |
| 6,535,909 B1 | 3/2003 | Rust | |
| 6,542,602 B1 | 4/2003 | Elazar | |
| 6,546,405 B2 | 4/2003 | Gupta et al. | |
| 6,560,328 B1 | 5/2003 | Bondarenko et al. | |
| 6,583,806 B2 | 6/2003 | Ludwig et al. | |
| 6,600,821 B1 * | 7/2003 | Chan et al. | 379/265.07 |
| 6,606,657 B1 | 8/2003 | Zilberstein et al. | |
| 6,636,256 B1 * | 10/2003 | Passman et al. | 348/143 |
| 6,662,228 B1 | 12/2003 | Limsico | |
| 6,665,644 B1 | 12/2003 | Kanevsky et al. | |
| 6,674,447 B1 | 1/2004 | Chiang et al. | |
| 6,683,633 B2 | 1/2004 | Holtzblatt et al. | |
| 6,697,858 B1 | 2/2004 | Ezerzer et al. | |
| 6,724,887 B1 | 4/2004 | Eilbacher et al. | |
| 6,738,456 B2 | 5/2004 | Wrona et al. | |
| 6,757,361 B2 | 6/2004 | Blair et al. | |
| 6,772,167 B1 | 8/2004 | Snavely et al. | |
| 6,772,396 B1 | 8/2004 | Cronin et al. | |
| 6,775,377 B2 | 8/2004 | McIllwaine et al. | |
| 6,792,575 B1 | 9/2004 | Samaniego et al. | |
| 6,810,414 B1 | 10/2004 | Brittain | |
| 6,820,083 B1 | 11/2004 | Nagy et al. | |
| 6,823,384 B1 | 11/2004 | Wilson et al. | |
| 6,870,916 B2 | 3/2005 | Henrikson et al. | |
| 6,901,438 B1 | 5/2005 | Davis et al. | |
| 6,931,402 B1 | 8/2005 | Pereira, III | |
| 6,959,078 B1 | 10/2005 | Eilbacher et al. | |
| 6,965,886 B2 | 11/2005 | Govrin et al. | |
| 7,181,017 B1 | 2/2007 | Nagel et al. | |
| 7,254,606 B2 | 8/2007 | Hamada | |
| 7,418,490 B1 | 8/2008 | Zhang et al. | |
| 7,418,727 B2 | 8/2008 | Lin et al. | |
| 7,424,494 B2 | 9/2008 | Jiang et al. | |
| 7,529,925 B2 | 5/2009 | Harkins | |
| 7,548,539 B2 * | 6/2009 | Kouretas et al. | 370/356 |
| 7,581,145 B2 * | 8/2009 | Nagamine | 714/48 |
| 7,685,206 B1 | 3/2010 | Mathew et al. | |
| 2001/0000962 A1 | 5/2001 | Rajan | |
| 2001/0032335 A1 | 10/2001 | Jones | |
| 2001/0043697 A1 | 11/2001 | Cox et al. | |
| 2002/0026590 A1 | 2/2002 | Kusunoki | |
| 2002/0026592 A1 | 2/2002 | Gavrila et al. | |
| 2002/0038363 A1 | 3/2002 | MacLean | |
| 2002/0052948 A1 | 5/2002 | Baudu et al. | |
| 2002/0065911 A1 | 5/2002 | von Klopp et al. | |
| 2002/0065912 A1 | 5/2002 | Catchpole et al. | |
| 2002/0128925 A1 | 9/2002 | Angeles | |
| 2002/0143925 A1 | 10/2002 | Pricer et al. | |
| 2002/0165954 A1 | 11/2002 | Eshghi et al. | |
| 2003/0055883 A1 | 3/2003 | Wiles et al. | |
| 2003/0078932 A1 | 4/2003 | Kaiserwerth et al. | |
| 2003/0079020 A1 | 4/2003 | Gourraud et al. | |
| 2003/0087629 A1 | 5/2003 | Juitt et al. | |
| 2003/0105974 A1 | 6/2003 | Griffin et al. | |
| 2003/0107591 A1 | 6/2003 | Jameson | |
| 2003/0144900 A1 | 7/2003 | Whitmer | |
| 2003/0154240 A1 | 8/2003 | Nygren et al. | |
| 2003/0163737 A1 | 8/2003 | Roskind | |
| 2004/0100507 A1 | 5/2004 | Hayner et al. | |
| 2004/0165717 A1 | 8/2004 | McIlwaine et al. | |
| 2005/0015775 A1 | 1/2005 | Russell et al. | |
| 2005/0021982 A1 | 1/2005 | Popp et al. | |
| 2005/0066160 A1 | 3/2005 | Parham et al. | |

| | | | |
|---|---|---|---|
| 2005/0091595 | A1 | 4/2005 | Shappell et al. |
| 2005/0135609 | A1 | 6/2005 | Lee et al. |
| 2005/0144186 | A1 | 6/2005 | Hesselink et al. |
| 2005/0242948 | A1* | 11/2005 | Tarr .................... 340/539.22 |
| 2006/0089932 | A1 | 4/2006 | Buehler et al. |
| 2006/0143286 | A1 | 6/2006 | Aoki et al. |
| 2006/0218394 | A1 | 9/2006 | Yang |
| 2007/0100829 | A1 | 5/2007 | Allen et al. |

FOREIGN PATENT DOCUMENTS

| | | | |
|---|---|---|---|
| EP | 0773687 | A2 | 5/1997 |
| EP | 0989720 | | 3/2000 |
| GB | 2369263 | | 5/2002 |
| WO | WO 98/43380 | | 11/1998 |
| WO | WO 00/16207 | | 3/2000 |

OTHER PUBLICATIONS

"DKSystems Integrates QM Perception with OnTrack for Training," Web page, unvereified print date of Apr. 1, 2002, unverified cover date of Jun. 15, 1999.

"OnTrack Online" Delivers New Web Functionality, Web page, unverified print date of Apr. 2, 2002, unverified cover date of Oct. 5, 1999.

"PriceWaterouseCoopers Case Study" The Business Challenge, Web page, unverified cover date of 2000.

Abstract, net.working: "An Online Webliography," *Technical Training* pp. 4-5 (Nov.-Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).

Bauer, "Technology Tools: Just-in-Time Desktop Training is Quick, Easy, and Affordable," *Technical Training* pp. 8-11 (May/Jun. 1998).

Beck et al., "Applications of AI in Education," *AMC Crossroads* vol. 1: 1-13 (Fall 1996) Web page, unverified print date of Apr. 12, 2002.

Benson and Cheney, "Best Practices in Training Delivery," *Technical Training* pp. 14-17 (Oct. 1996).

Bental and Cawsey, "Personalized and Adaptive Systems for Medical Consumer Applications," Communications ACM 45(5): 62-63 (May 2002).

Benyon and Murray, "Adaptive Systems: from intelligent tutoring to autonomous agents," pp. 1-52, Web page, unknown date.

Blumenthal et al., "Reducing Development Costs with Intelligent Tutoring System Shells," pp. 1-5, Web page, unverified print date of Apr. 9, 2002, unverified cover date of Jun. 10, 1996.

Brusilosy et al., "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin, ISIS-Tutor: An Intelligent Learning Environment for CD/ISIS Users, @ pp. 1-15 Web page, unverified print date of May 2, 2002.

Brusilovsky, "Adaptive Educational Systems on the World-Wide-Web: A Review of Available Technologies," pp. 1-10, Web Page, unverified print date of Apr. 12, 2002.

Byrnes et al., "The Development of a Multiple-Choice and True-False Testing Environment on the Web," pp. 1-8, Web page, unverified print date of Apr. 12, 2002, unverified cover date of 1995.

Calvi and DeBra, "Improving the Usability of Hypertext Courseware through Adaptive Linking," *ACM*, unknown page numbers (1997).

Coffey, "Are Performance Objectives Really Necessary?" *Technical Skills and Training* pp. 25-27 (Oct. 1995).

Cohen, "Knowledge Management's Killer App," pp. 1-11, Web page, unverified print date of Sep. 12, 2002, unverified cover date of 2001.

Cole-Gomolski, "New Ways to manage E-Classes," *Computerworld* 32(48):4344 (Nov. 30, 1998).

Cross: "Sun Microsystems—the SunTAN Story," Internet Time Group 8 (© 2001).

Cybulski and Linden, "Teaching Systems Analysis and Design Using Multimedia and Patterns," unknown date, unknown source.

De Bra et al., "Adaptive Hypermedia: From Systems to Framework," *Acm* (2000).

De Bra, "Adaptive Educational Hypermedia on the Web," *Communications ACM* 45(5):60-61 (May 2002).

Dennis and Gruner, "Computer Managed Instruction at Arthur Andersen & Company: A Status Report," *Educational Technical* pp. 7-16 (Mar. 1992).

Diessel et al., "Individualized Course Generation: A Marriage Between CAL and ICAL," *Computers Educational* 22(1/2) 57-65 (1994).

Dyreson, "An Experiment in Class Management Using the World-Wide Web," pp. 1-12, Web page, unverified print date of Apr. 12, 2002.

E Learning Community, "Excellence in Practice Award: Electronic Learning Technologies," *Personal Learning Network* pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.

*e-Learning the future of learning*, THINQ, Limited, London, Version 1.0 (2000).

Eline, "A Trainer's Guide to Skill Building," *Technical Training* pp. 34-41 (Sep./Oct. 1998).

Eline, "Case Study: Briding the Gap in Canada's IT Skills," *Technical Skills and Training* pp. 23-25 (Jul. 1997).

Eline "Case Study: IBT's Place in the Sun," *Technical Training* pp. 12-17 (Aug./Sep. 1997).

Fritz, "CB templates for productivity: Authoring system templates for trainers," *Emedia Professional* 10(8):6678 (Aug. 1997).

Fritz, "ToolBook II: Asymetrix's updated authoring software tackles the Web," *Emedia Professional* 10(20): 102106 (Feb. 1997).

Gibson et al., "A Comparative Analysis of Web-Based Testing and Evaluation Systems," pp. 1-8, Web page, unverified print date of Apr. 11, 2002.

Halberg and DeFiore, "Curving Toward Performance: Following a Hierarchy of Steps Toward a Performance Orientation," Technical Skills and Training pp. 9-11 (Jan. 1997).

Harsha, "Online Training 'Sprints' Ahead," *Technical Training* pp. 27-29 (Jan./Feb. 1999).

Heideman, "Training Technicians for a High-Tech Future: These six steps can help develop technician training for high-tech work," pp. 11-14 (Feb./Mar. 1995).

Heideman, "Writing Performance Objectives Simple as A-B-C (and D)," Technical Skills and Training pp. 5-7 (May/Jun. 1996).

Hollman, "Train Without Pain: The Benefits of Computer-Based Training Tools," pp. 1-11, Web page, unverified print date of Mar. 20, 2002, unverified cover date of Jan. 1, 2000.

Klein, "Command Decision Training Support Technology," Web page, unverified print date of Apr. 12, 2002.

Koonce, "Where Technology and Training Meet," *Technical Training* pp. 10-15 (Nov./Dec. 1998).

Kursh, "Going the distance with Web-based training," *Training and Development* 52(3): 5053 (Mar. 1998).

Larson, "Enhancing Performance Through Customized Online Learning Support," *Technical Skills and Training* pp. 25-7 (May/Jun. 1997).

Linton, et al. "OWL: A Recommender System for Organization-Wide Learning," *Educational Technical Society* 3(1): 62-76 (2000).

Lucadamo and Cheney, "Best Practices in Technical Training," *Technical Training* pp. 21-26 (Oct. 1997).

McNamara, "Monitoring Solutions: Quality Must be Seen and Heard," *Inbound/Outbound* pp. 66-67 (Dec. 1989).

Merrill, "The New Component Design Theory: Instruction design for courseware authoring," *Instructional Science* 16:19-34 (1987).

Minton-Eversole, "IBT Training Truths Behind the Hype," *Technical Skills and Training* pp. 15-19 (Jan. 1997).

Mizoguchi, "Intelligent Tutoring Systems: The Current State of the Art," Trans. IEICE E73(3):297-307 (Mar. 1990).

Mostow and Aist, "The Sounds of Silence: Towards Automated Evaluation of Student Learning a Reading Tutor that Listens" *American Association for Artificial Intelligence*, Web page, unknown date Aug. 1997.

Mullier et al., "A Web base Intelligent Tutoring System," pp. 1-6, Web page, unverified print date of May 2, 2002.

Nash, Database Marketing, 1993, pp. 158-165, 172-185, McGraw Hill, Inc. USA.

Nelson et al. "The Assessment of End-User Training Needs," Communications ACM 38(7):27-39 (Jul. 1995).

O'Herron, "CenterForce Technologies' CenterForce Analyzer," Web page unverified print date of Mar. 2, 2002, unverified cover date of Jun. 1, 1999.

O'Roark, "Basic Skills Get a Boost," Technical Training pp. 10-13 (Jul./Aug. 1998).

Papa et al., "A Differential Diagnostic Skills Assessment and Tutorial Tool," Computer Education 18(1-3):45-50 (1992).

PCT International Search Report, International Application No. PCT/US03/02541, mailed May 12, 2003.

Phaup, "New Software Puts Computerized Tests on the Internet: Presence Corporation announces breakthrough Question Mark™ Web Product," Web page, unverified print date of Apr. 1, 2002.

Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.

Phaup, "Question Mark Introduces Access Export Software," Web page, unverified print date of Apr. 2, 2002, unverified cover date of Mar. 1, 1997.

Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.

Piskurich, Now-You-See-'Em, Now-You-Don't Learning Centers, Technical Training pp. 18-21 (Jan./Feb. 1999).

Read, "Sharpening Agents' Skills," pp. 1-15, Web page, unverified print date of Mar. 20, 2002, unverified cover date of Oct. 1, 1999.

Reid, "On Target: Assessing Technical Skills," Technical Skills and Training pp. 6-8 (May/Jun. 1995).

Stormes, "Case Study: Restructuring Technical Training Using ISD," Technical Skills and Training pp. 23-26 (Feb./Mar. 1997).

Tennyson, "Artificial Intelligence Methods in Computer-Based Instructional Design," Journal of Instructional Development 7(3): 17-22 (1984).

The Editors, Call Center, "The Most Innovative Call Center Products We Saw in 1999," Web page, unverified print date of Mar. 20, 2002, unverified cover date of Feb. 1, 2000.

Tinoco et al., "Online Evaluation in WWW-based Courseware," ACM pp. 194-198 (1997).

Uiterwijk et al., "The virtual classroom," InfoWorld 20(47):6467 (Nov. 23, 1998).

Unknown Author, "Long-distance learning," InfoWorld 20(36):7676 (1998).

Untitled, 10th Mediterranean Electrotechnical Conference vol. 1 pp. 124-126 (2000).

Watson and Belland, "Use of Learner Data in Selecting Instructional Content for Continuing Education," Journal of Instructional Development 8(4):29-33 (1985).

Weinschenk, "Performance Specifications as Change Agents," Technical Training pp. 12-15 (Oct. 1997).

Witness Systems promotional brochure for eQuality entitled "Bringing eQuality to Business".

Aspect Call Center Product Specification, "Release 2.0", Aspect Telecommuications Corporation, May 23, 1998 798.

Metheus X Window Record and Playback, XRP Features and Benefits, 2 pages Sep. 1994 LPRs.

"Keeping an Eye on Your Agents," Call Center Magazine, pp. 32-34, Feb. 1993 LPRs & 798.

Anderson: Interactive TVs New Approach, The Standard, Oct. 1, 1999.

Ante, Everything You Ever Wanted to Know About Cryptography Legislation . . . (But Were to Sensible to Ask), PC world Online, Dec. 14, 1999.

Berst. It's Baa-aack. How Interative TV is Sneaking Into Your Living Room, The AnchorDesk, May 10, 1999.

Berst. Why Interactive TV Won't Turn You On (Yet), The AnchorDesk, Jul. 13, 1999.

Borland and Davis. US West Plans Web Services on TV, CNETNews.com, Nov. 22, 1999.

Brown. Let PC Technology Be Your Tv Guide, PC Magazine, Jun. 7, 1999.

Brown. Interactive TV: The Sequel, NewMedia, Feb. 10, 1998.

Cline. Déjà vu—Will Interactive TV Make It This Time Around?, DevHead, Jul. 9, 1999.

Crouch. TV Channels on the Web, PC World, Sep. 15, 1999.

D'Amico. Interactive TV Gets $99 set-top box, IDG.net, Oct. 6, 1999.

Davis. Satellite Systems Gear Up for Interactive TV Fight, CNETNews.com, Sep. 30, 1999.

Diederich. Web TV Data Gathering Raises Privacy Concerns, ComputerWorld, Oct. 13, 1998.

Digital Broadcasting, Interactive TV News.

EchoStar, MediaX Mix Interactive Multimedia With Interactive Television, PRNews Wire, Jan. 11, 1999.

Furger. The Internet Meets the Couch Potato, PCWorld, Oct. 1996.

Hong Kong Comes First with Interactive TV, SCI-TECH, Dec. 4, 1997.

Interactive TV Overview TimeLine, Interactive TV News.

Interactive TV Wars Heat Up, Industry Standard.

Needle. Will the Net Kill Network TV? PC World Online, Mar. 10, 1999.

Kane. AOL-Tivo: You've Got Interactive TV, ZDNN, Aug. 17, 1999.

Kay. E-Mail in Your Kitchen, PC World Online, 093/28/96.

Kenny. TV Meets Internet, PC World Online, Mar. 28, 1996.

Linderholm. Avatar Debuts Home Theater PC, PC World Online, Dec. 1, 1999.

Mendoza. Order Pizza WhileYyou Watch, ABCNews.com.

Moody. WebTV: What the Big Deal?, ABCNews.com.

Murdorf, et al. Interactive Television—Is There Life After the Internet?, Interactive TV News.

Needle. PC, TV or Both?, PC World Online.

Interview with Steve Perlman, CEO of Web-TV Networks, PC World Online.

Press. Two Cultures, The Internet and Interactive TV, Universite de Montreal.

Reuters. Will TV Take Over Your PC?, PC World Online.

Rohde. Gates Touts Interactive TV, InfoWorld, Oct. 14, 1999.

Ross. Broadcasters Use TV Signals to Send Data, PC World Oct. 1996.

Schlisserman. Is Web TV a Lethal Weapon?, PC World Online.

Stewart. Interactive Television at Home: Television Meets the Internet, Aug. 1998.

Swedlow. Computer TV Shows: Ready for Prime Time?, PC World Online.

Wilson. U.S. West Revisits Interactive TV, Interactive Week, Nov. 28, 1999.

Sandhu, Ravi S. et al., "Role-Based Access Control Models", IEEE Computer, vol. 29, No. 2, Feb. 1996, pp. 38-47.

Nyanchama, Matunda et al., "Access Rights Administration in Role-Based Security Systems", Database Security VIII: Status and Prospects, 1994, pp. 37-56.

Barkley, John et al., "Managing Role/Permission Relationships Using Object Access Types", Proceedings of the 3rd ACM Workshop on Role-Based Access Control, 1998, pp. 73-80.

Covington, Michael J. et al., "Generalized Role-Based Access Control for Security Future Applications", 23rd National Information Systems Security Conference, Baltimore, Oct. 2000, 11 pages.

Ferraiolo, David F. et al., Role-Based Access Control (RBAC), Features and Motivations, 1995, 8 pages.

Ferraiolo, David F. et al., "Role-Based Access Control", Artech House, 2003, Chapters 2-5, 10 and 12, 163 pages.

Nakamura, Yuichi, "Simplifying Policy Management with SELinux Policy Editor", Hitachi Software Engineering Co., Ltd., 2005, http://selinux-symposium.org/2005/presentations/sessions4/4-2-nakamura.pdf., 34 pages.

Dridi, G. et al., "Administration of an RBAC System", Proc. Hawaii International Conference on System Sciences (HICSS-37), 2004, 6 pages.

Illiner, Stefan et al., "Security Service Adaptation for Embedded Service Systems", Changing Environments, 6 pages.

Illiner, Stefan et al., "Policy Controlled Automated Management of Distributed and Embedded Service Systems", Department of Computer Science, University of Dortmund, 6 pages.

Guo, Yuxia, "User/Group Administration for RBAC", MS Thesis, University of Western Ontario, May 1999, 116 pages.

Oh, Sejong et al., "A Model for Role Administration Using Organization Structure", Processings of the Seventh ACM Symposium on Access Control Models and Technologies (SACMAT'02), 2002, pp. 155-162.

Calkins, Bill, "Inside Solaris 9", New Riders Publishing, Nov. 2002, Chapter 18, 4 pages.

* cited by examiner

FIG. 6

SYSTEMS AND METHODS FOR MANAGING ALARMS FROM RECORDERS

CROSS-REFERENCE TO RELATED APPLICATION

This application is a continuation-in-part of copending U.S. utility application entitled, "SYSTEMS AND METHODS FOR MANAGING RECORDERS FROM A CENTRAL POINT OF ADMINISTRATION," having Ser. No. 11/359,325, filed on Feb. 22, 2006, which is entirely incorporated herein by reference.

TECHNICAL FIELD

The present invention is generally related to managing of recorders.

BACKGROUND

As shown in FIG. 1, a call center premises 103 includes branches 126, 129, 133, in which each branch includes a recording system 105, 107, 110. The recording. systems 105, 107, 110 include recorder computing devices 116, 119, 123 that are connected to recorders 106, 109, 113, respectively. The recorders record interactions between an agent and a customer or between agents, such as conversations in a TDM or IP environment, instant messenger (IM) chatting, and video conferencing, for example.

Each computing device includes a recorder manager (not shown) that controls all components, alarms and other activities associated with a corresponding recorder. Notably, if a user has access to such a recorder at this level, the user has full control of all the features on the recorder. However, a user in branch 126 can control the features on the recorder 106, but cannot control the features on recorders 109, 113 in branches 129, 133. Thus, recorder control is somewhat segmented.

SUMMARY OF THE INVENTION

Disclosed is an enterprise manager that enables a centralized control of recorders. The enterprise manager can be deployed within a central application module, within a company premises, distributed across multiple geographic locations, and/or embedded into the network as a service on a network infrastructure, including legacy infrastructure and potentially VoIP-based infrastructure. The enterprise manager can provide security through setting access levels to individual roles and users. The enterprise manager can provide a hierarchical based management display of installed recorders, update authentication servers associated with a recorder from the enterprise manager, and implement reliable messaging to achieve a task. The enterprise manager can display alarms from all of the recorders in a hierarchical list, and copy recorder configuration across recorders. Such an enterprise manager can be administered at a centralized location and/or be embedded into a network as a service on the network and/or as intelligence in the network infrastructure.

Systems and methods for managing alarms from recorders are provided. An exemplary method comprises the steps of: receiving alarm alerts from one or more recorders by a central application module, the alarm alerts being operative to notify a user of a problem associated with the one or more recorders, storing the alarm alerts in an alarm database, and managing alarm alerts by the central application module so that a user can view the alarm alerts.

In some embodiments, a user may be able to easily and quickly advance (that is, drill down) to the recorder of interest responsive to receiving an alarm alert and take any necessary corrective action, such as reset the recorder or clear the alarms. The user can even review the various alarms, such as when the alarms were last triggered and how many alarms of that type have occurred.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims. It is intended that all such additional systems, methods, features, and advantages included within this description, be within the scope of the present invention and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 6 is an exemplary display diagram from the display device of a central application module, such as shown in FIG. 2, that illustrates a graphical user interface for administrators to manage access rights of users.

DETAILED DESCRIPTION

Disclosed herein are systems and methods for managing recorders in call center premises, such as through an enterprise manager. The enterprise manager enables a centralized control of recorders. The enterprise manager can be administered at a centralized location, e.g., within a company premises, in a single central application module, and/or embedded into a network as a service on the network and/or as intelligence in the network infrastructure.

Exemplary systems are first discussed with reference to the figures. Although these systems are described in detail, they are provided for purposes of illustration only and various modifications are feasible. After the exemplary systems have been described, examples of flow diagrams and sequence diagrams of the systems are provided to explain the manner in which a voice communication can be recorded.

Figure 1:
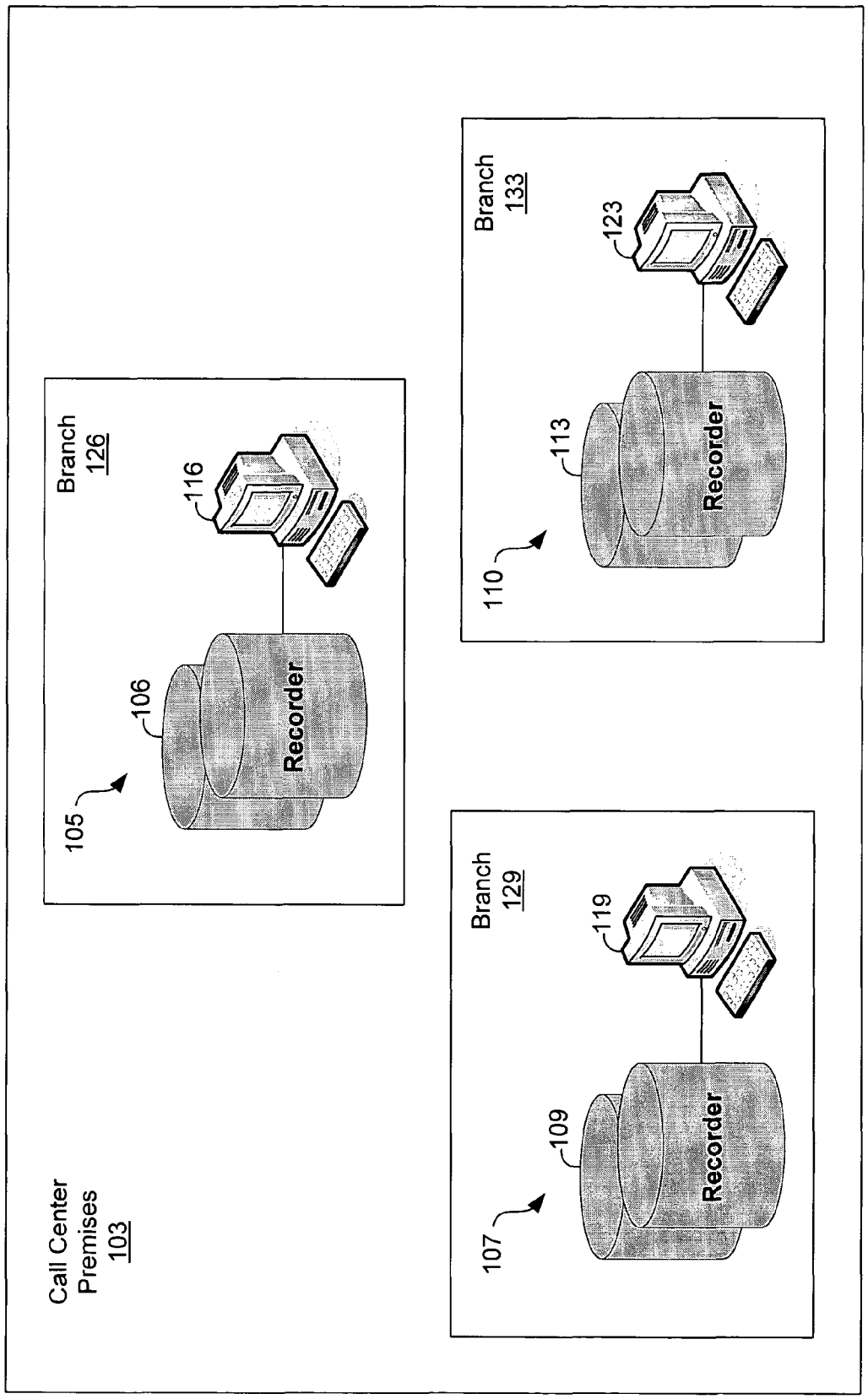
FIG. 1 is a schematic view of an embodiment of a prior art system for managing recorders in a call center premises.
Figure 2:
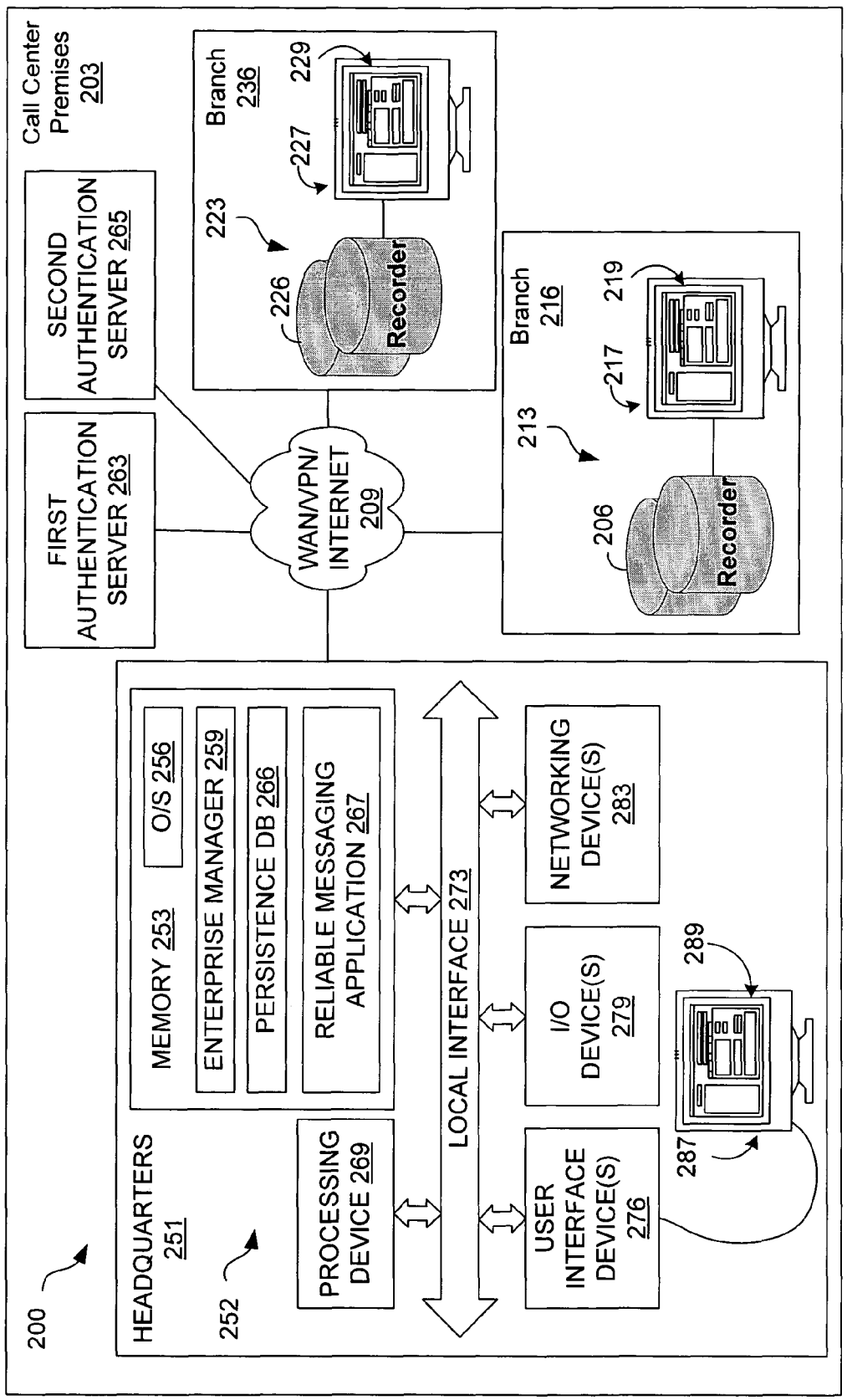
FIG. 2 is a schematic view of an embodiment of a system for managing recorders in a call center premises.

Referring now in more detail to the figures, FIG. 2 is a schematic view of an embodiment of a system for managing recorders in a call center premises. The system 200 can be located in a call center premises 203 that includes a central application module 252. Server 252 can be located in headquarters 251 and is connected to a network 209 (e.g., wide area network (WAN), local area network (LAN), virtual private network (VPN), and Internet). Recording systems 213, 223 can be located in branches 216, 236 and include recorders 206, 226 that are connected to recording computing devices 217, 227 having browsers 219, 229, respectively. Each recording system 213, 223 is connected to the network 209, which communicates with the central application module 252, a first authentication server 253, and a second authentication server 265.

The central application module 252 comprises a processing device 269, memory 253, one or more user interface devices 276, one or more input/output (I/O) devices 279, and one or more networking devices 283, each of which is connected to a local interface 273. The processing device 269 can include any custom made or commercially available processor, a central processing unit (CPU) or an auxiliary processor among several processors associated with the central application module 252, a semiconductor base microprocessor (in the form of microchip) or a macroprocessor. The memory 253 can include any one or a combination of volatile memory elements (e.g., random access memory (RAM), such as DRAM, SRAM, etc.) and non-volatile memory elements (e.g., ROM, hard drive, tape, CD-ROM, etc.).

The one or more user interface devices 276 comprise elements with which the user (e.g., user and supervisor) can interact with the central application module 252. Where the central application module 252 comprises a personal computer (e.g., desktop or laptop computer, or similar device), these components can comprise those typically used in conjunction with a PC such as a display device 287 (having display diagrams 287), headset device, keyboard, and mouse.

The one or more I/O devices 279 comprise components used to accelerate connection of the central application module 252 to other devices and therefore, for instance, comprise one or more serial, small computer system interface (SCSI), universal serial bus (USB), or IEEE 1394 (e.g., Firewall™) connection elements. The networking devices 283 comprise the various components used to transmit and/or receive data over the network 209, where provided. By way of example, the networking devices 283 include a device that communicates both inputs and outputs, for instance, a modular/demodular (e.g., modem), a radio frequency (RF), or infrared (IR) transceiver, a telephonic interface, a bridge, and a router, as well as a network card, etc.

Memory 253 normally comprises various programs (in software and/or firmware), including an operating system (O/S) 256, an enterprise manager 259, a persistence database 266, and a reliable messaging application 267. The O/S 256 controls the execution of programs, including the enterprise manager 259 and reliable messaging application 267, and provides scheduling, input/output control, file and data, management, memory management, communication control and related services. The enterprise manager 259 facilitates the management of recorders in the call center premises 203 as well as enterprise-wide security, events, and activities. Typically, a process of the enterprise manager 259 involves communicating with the recorder computing devices 217, 227 via the network 209 and managing the recorders, particularly configuring roles of users to have specific access rights with respect to the recorders. Operation of the enterprise manager 259 is described in relation to FIG. 3.

The enterprise manager 259 can update authentication information with the recorder computing devices to communicate with a first authentication server 263 and a second authentication server 265. The operation of updating information with the recorder computing devices to communicate with a first authentication server 263 and a second authentication server 265 is described in relation to FIGS. 7A-B. The reliable messaging application 267 assures that the recorder computing devices perform messages sent by the enterprise manager 259. Operation of the reliable messaging application 267 is described in relation to FIG. 8. The enterprise manager 259 and reliable messaging application 267 can be administered at a centralized location and/or embedded into a network as a service on the network and/or as intelligence in the network infrastructure.

Figure 3:
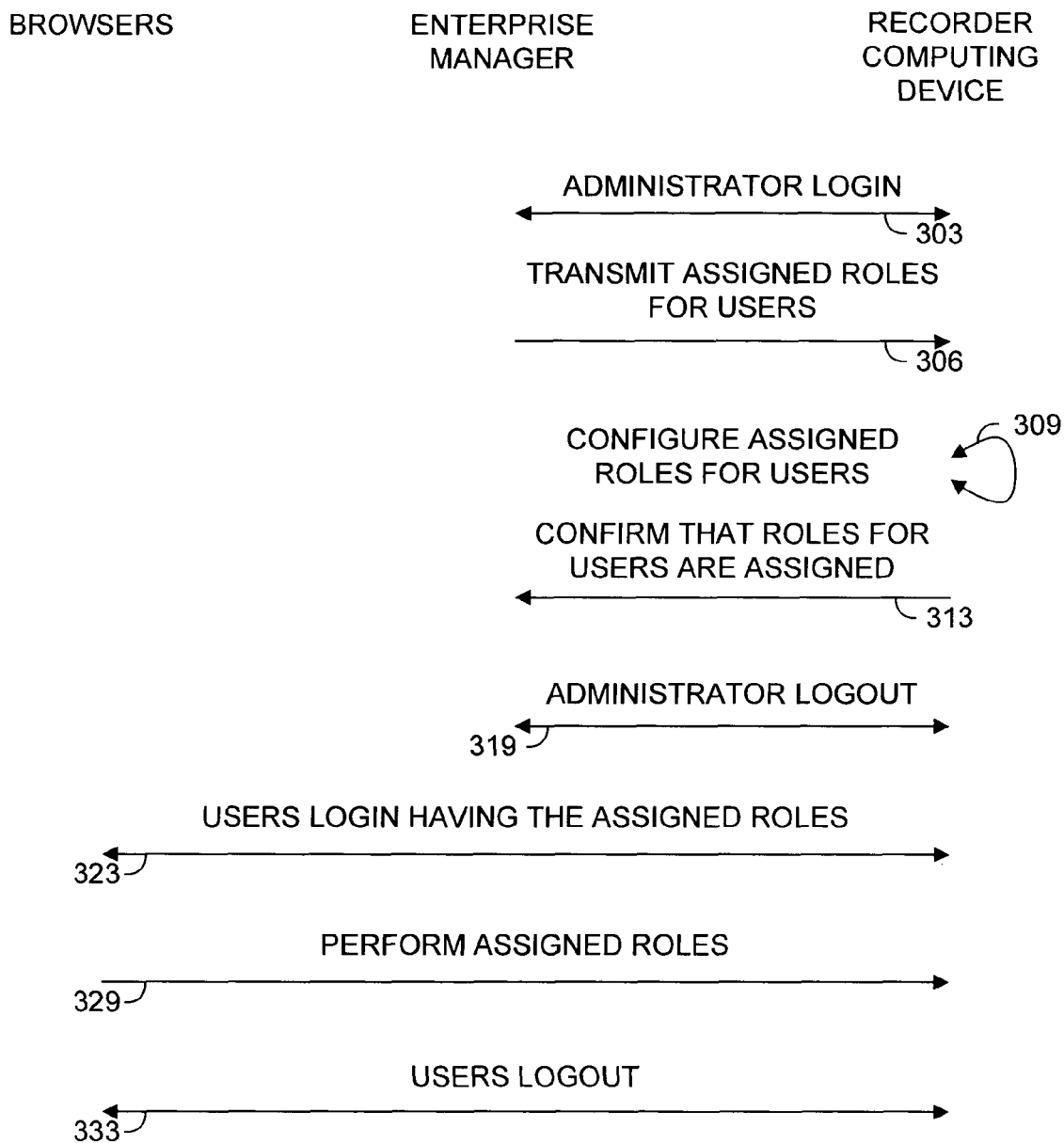
FIG. 3 is a sequence diagram of an embodiment of a system, such as shown in FIG. 2, in which recorders in a call center premises can be managed through a single central application module.
Figure 6:
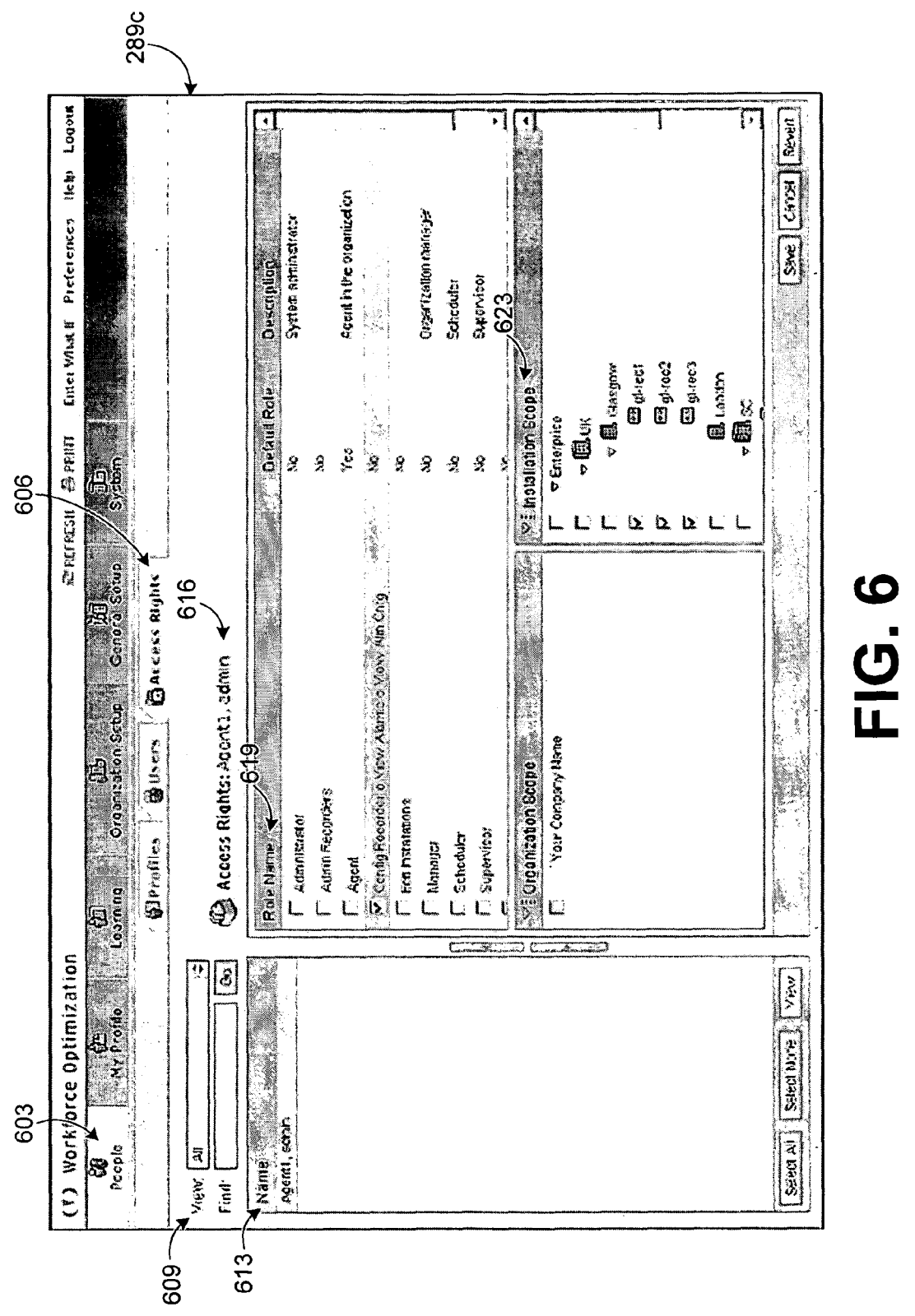

FIG. 3 is a sequence diagram of an embodiment of a system, such as shown in FIG. 2, in which recorders in a call center premises can be managed through a single central application module. Beginning with event 303, an administrator logs into the enterprise manager using an administrator's login information. Once the administrator is logged into the enterprise manager, the administrator can assign roles to users with specific access rights and privileges to allow them to use recorder administration features. Roles are used to group privileges so that they can be easily assigned to others. Hence, the enterprise manager provides a role-based security environment for operating the recorders. For example, the administrator can assign user #1 to have access to recorder 226 that is located in Chicago (branch 236). User #1 can have specific access rights that can be determined down to a high degree of granularity. Such access rights typically take the form of view or edit rights to a particular area of configuration within the recorder. Examples of display diagrams in FIGS. 4-6 illustrate how the administrator assigns roles to the users.

The assigned roles for the users are transmitted to the recorder computing devices as shown at event 306. At event 309, the recorder computing device configures the roles of the users based on the information received from the enterprise manager. At event 313, the recorder computing devices confirm that the roles of the users are assigned, and at event 319, the administrator can logout of the system. At event 323, the users log into the recorder computing devices with assigned roles enabling the users to perform recorder administration features. At event 329, the users perform the roles that were assigned by the administrator, and at event 333, the users log out of the recorder computing devices. It should be noted that the role-based security method could be applied in a retailing or banking environment. For example, in a banking environment, a primary user, e.g., a parent, can allocate privileges to secondary users, e.g., his/her kids. The privileges could include being able to pay bills up to a certain amount of money or being able to only pay a certain credit card bill, for example.

Figure 4:
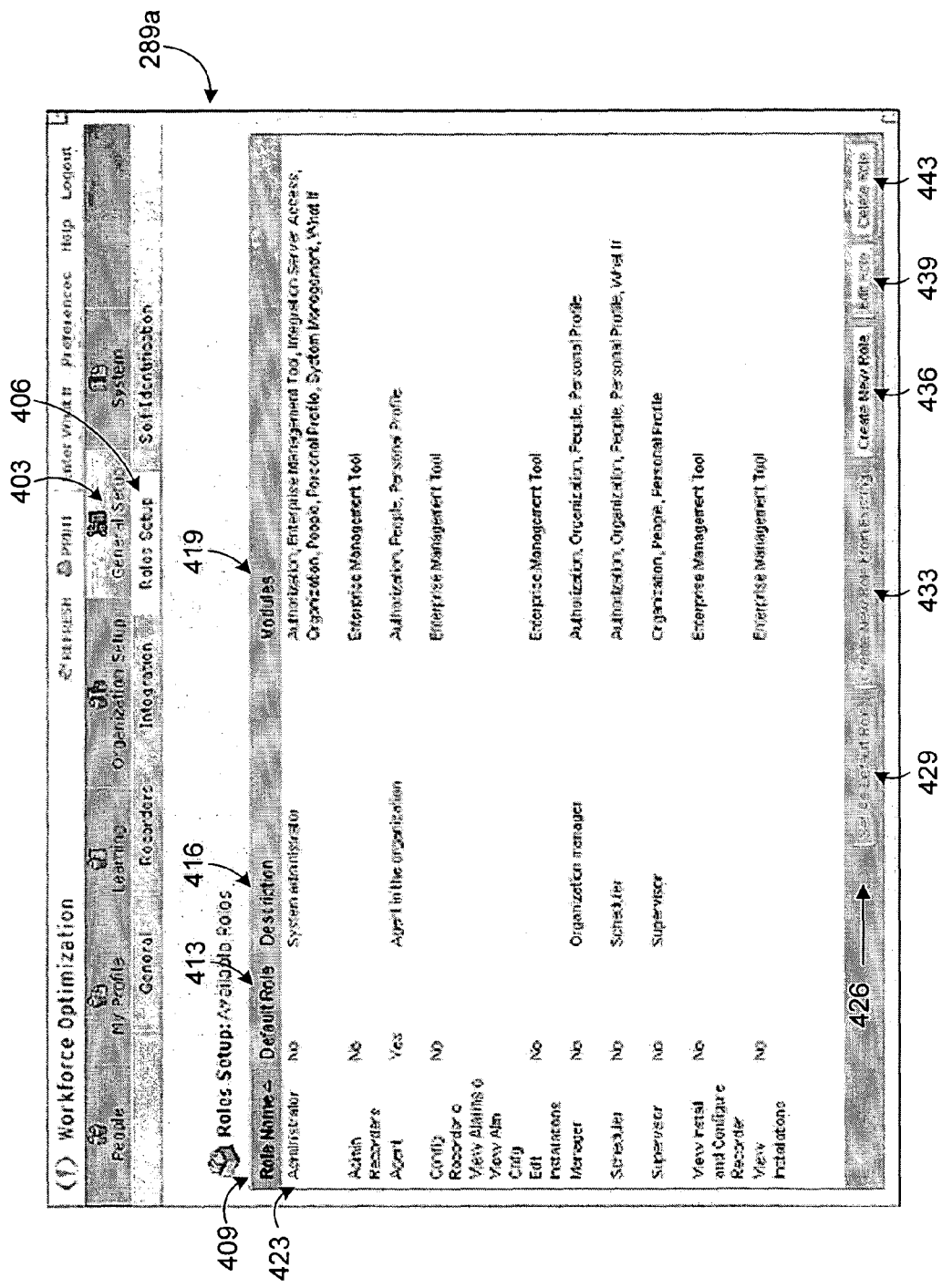
FIG. 4 is an exemplary display diagram from the display device of a central application module, such as shown in FIG. 2, that illustrates a graphical user interface for administrators to manage roles of users.
Figure 5:
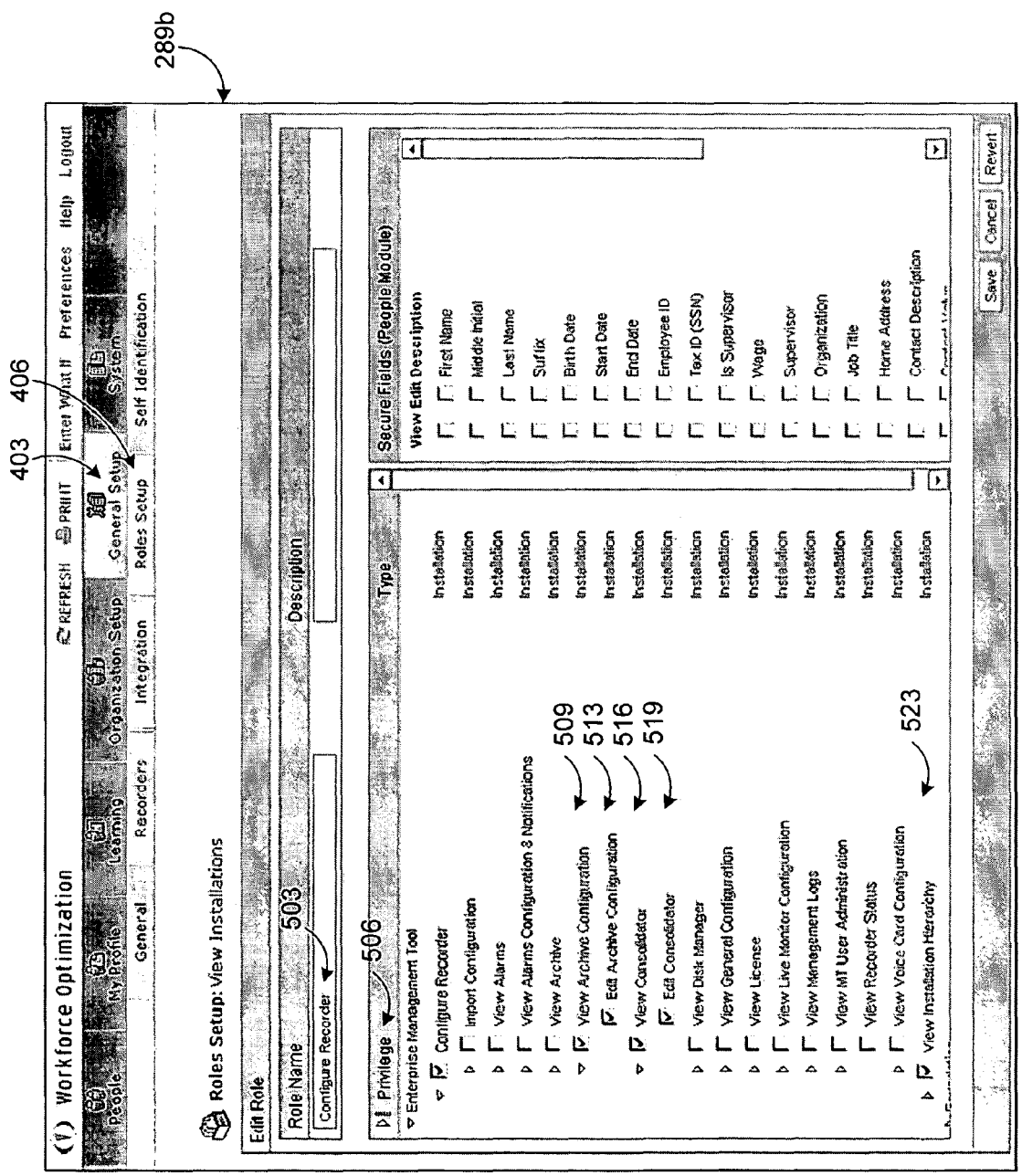
FIG. 5 is an exemplary display diagram from the display device of a central application module, such as shown in FIG. 2, that illustrates a graphical user interface for administrators to create and edit roles of users.

FIG. 4 is an exemplary display diagram from the display device of a central application module, such as shown in FIG. 2, that illustrates a graphical user interface for administrators to manage roles of users. In this example, profiles of the administrator and users have been created and these persons can access the assigned recorder computing devices and the enterprise manager. In addition, users created locally in a branch on a recorder have full privileges on that recorder but do not have access to the enterprise manager until they are created in the environment of the enterprise manager. Once the profiles are created, users can be assigned usernames and passwords as well as their roles.

The administrator can view available roles as shown in display diagram 289a by selecting file menu "General Setup" 403 and option "Roles Setup" 406. The display diagram 289a illustrates a list of available roles that includes fields such as role name 409, default role 413, description 416, and modules 419. A Yes/No text area in the default role field 413 indicates that the role is to be assigned to users if no other is assigned to the role. The modules field 419 indicates the level of security assigned to the role. Within each module, a subset of security levels exist. For example, administrator 423 does not require a user to be assigned to the role at all times and is assigned the following level of security: Authorization, Enterprise Management Tool, Integration Server Access, Organization, People, Personal Profile, System Management, and What If. Display diagram 289a includes action features 426 such as setting a default role 429, creating a new role from existing roles 433, creating new role 436, editing role 439, and deleting role 443.

FIG. 5 is an exemplary display diagram from the display device of a central application module, such as shown in FIG. 2, that illustrates a graphical user interface for administrators to create and edit roles of users. An administrator can create and edit roles as shown in display diagram 289b by selecting create new role option 436 and edit role option 439 of action features 426 in FIG. 4. If the administrator selects create new role 436, a role can be created. Referring to FIG. 5, the administrator selected role name "Configure Recorder" 503 from the list 409 and edit role option 439 of the action features 429 in FIG. 4, which then provides display diagram 289b entitled "Edit Role". The display diagram 289b illustrates a list of privileges 506 that can be assigned to the Configure Recorder role 503. The privileges 506 for Configure Recorder role 503 that are selected include, for example, view archive configuration 509 having edit archive configuration 513, view consolidator having edit consolidator 516, and view installation hierarchy 523. The view hierarchy enables an administrator to assign a role to a user at any point within the recorder hierarchy.

FIG. 6 is an exemplary display diagram from the display device of a central application module, such as shown in FIG. 2, that illustrates a graphical user interface for administrators to manage access rights of users. After the roles have been created and the privileges assigned to the roles, the administrator can assign the roles to the users. The administrator can view and edit access rights of the users as shown in display diagram 289c by selecting file menu "People" 603 and "Access Rights" option 606. View field 609 enables the administrator to choose a user from a dropdown list of groups of users. Name field 613 is a list of all users in the group specified under the view field 609. The administrator can select a user on the list of the name section 613 to view and edit the access rights of the selected user. UserName field 616 shows the username used by the user whose access rights are being viewed. Assigned role field 619 enables the administrator to assign and edit the roles of the user.

Installation scope field 623 enables the administrator to assign and edit scopes granted to the user, such as one or more geographic locations or sites. In this example, the installation scope field provides a hierarchy list of geographic locations or sites. An enterprise site is the top level and a UK site is a sub-level of the enterprise site. Glasgow, London, and SC sites are sub-levels of the UK site. The administrator gave access rights of recorders (gl-rec1, gl-rec2, and gl-rec3) to the User within the Glasgow site. This would limit the user capabilities at the Glasgow site and the user would not be given access to non-selected sites, such as the London and SC sites. That said, the user might not be able to view the non-selected sites. Additionally or alternatively, the hierarchy list can be structured as business units. For example, an enterprise site is the top level and billing service and customer service sites are sub-levels.

Figure 7A:
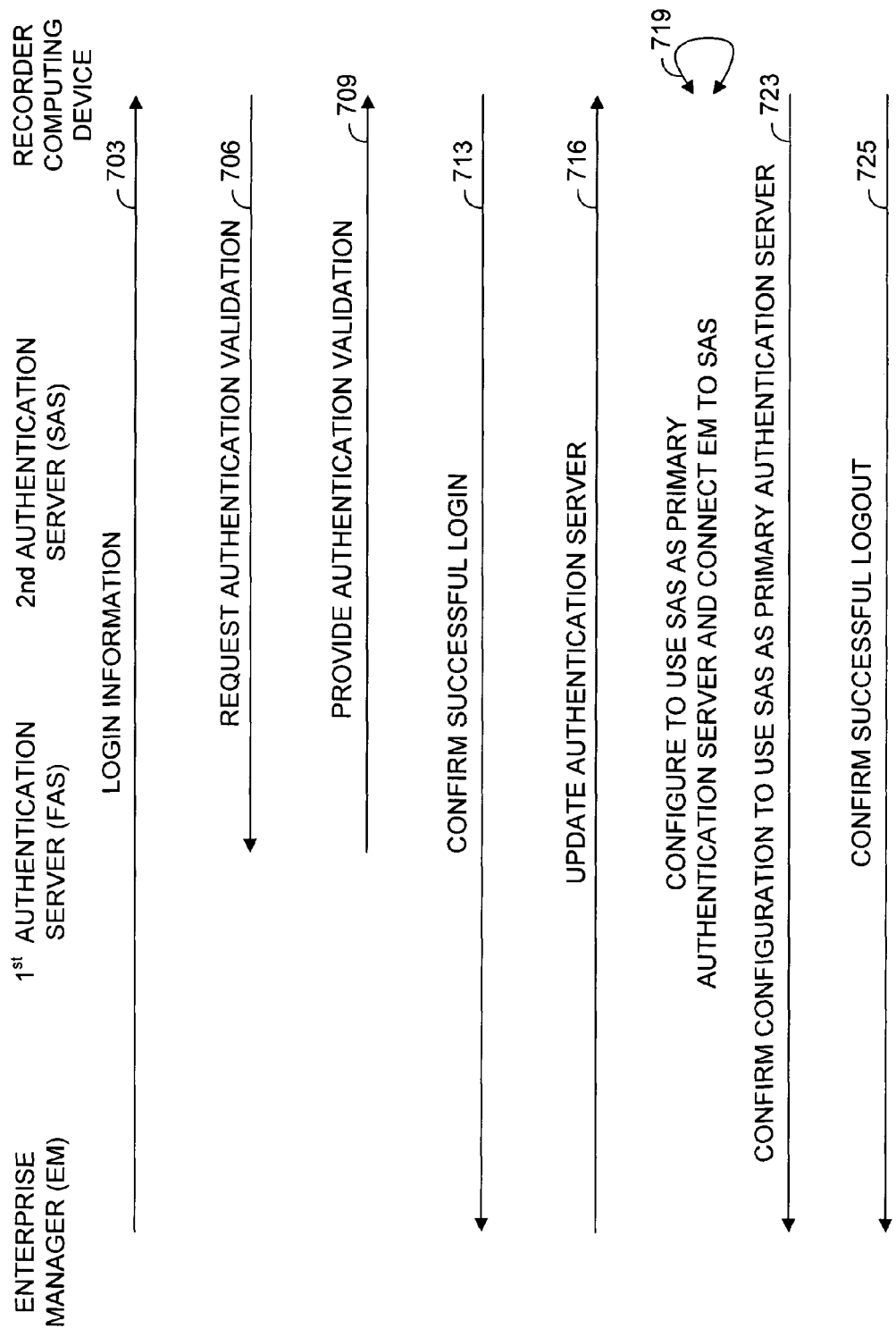
FIGS. 7A-B are sequence diagrams of an embodiment of a system, such as shown in FIG. 2, in which a recorder can be updated to communicate with an authentication server.
Figure 7B:
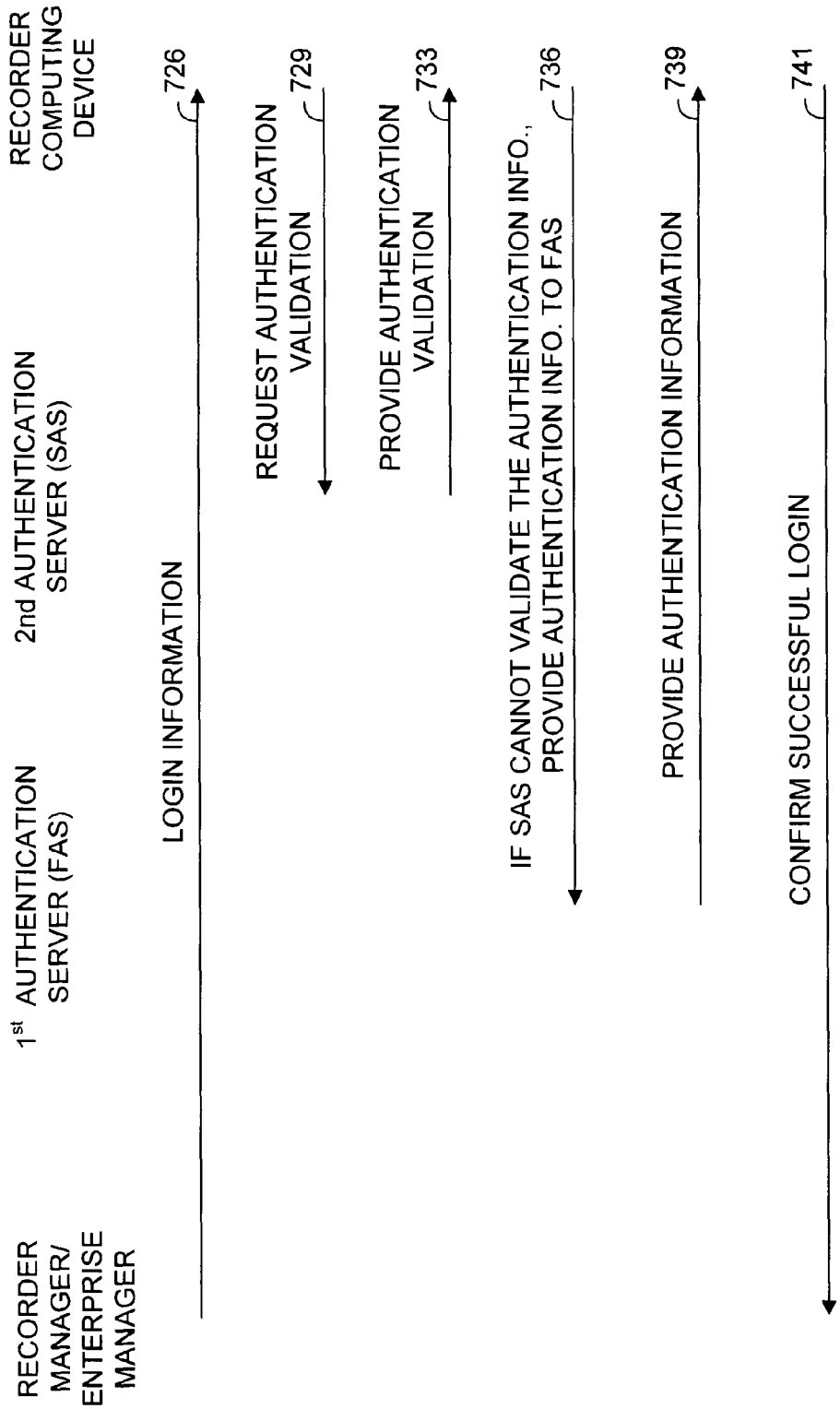

FIGS. 7A-B are sequence diagrams of an embodiment of a system, such as shown in FIG. 2, in which a recorder can be updated to communicate with an authentication server. Beginning with event 703, an administrator logs into an enterprise manager using, for example, username and password, and transmits login information to a recorder computing device. At event 706, the recorder computing device requests authentication validation associated with the login information to a first authentication server. At event 709, the first authentication server validates the login information and transmits authentication validation associated with login information to the recorder computing device. At event 713, the recorder computing device confirms successful login with the enterprise manager.

At event 716, the enterprise manager instructs the recorder computing device to update the authentication server by using a second authentication server as a primary authentication server for the enterprise manager and the first authentication server as a secondary authentication server for the enterprise manager. At event 719, the recorder computing device configures to use the second authentication server as primary authentication server for the enterprise manager and the first authentication server as a secondary authentication server for the enterprise manager.

Additionally or alternatively, if the recorder computing device cannot configure to use the second authentication server, the recorder computing device can automatically be configured to use the first authentication server. Additionally or alternatively, the enterprise manager saves the settings of the first authentication server and enables users to manually revert to the saved settings of the first authentication server if the recorder computing device cannot configure to use the second authentication server. The saved settings are transmitted to the recorder computing device, which configures to use the first authentication server.

Additionally or alternatively, the first authentication server can be configured as a primary authentication server for logging into the recorder manager and the second authentication server can be configured as the secondary authentication server for logging into the enterprise manager. Additionally or alternatively, the first authentication server can be configured as a primary authentication server for logging into the enterprise manager, and the recorder can be configured to communicate with the second authentication server for updating the authentication server of the recorders. Additionally or alternatively, the recorder can be configured to continue using the first authentication server as a primary authentication server and then use the second authentication server as a secondary authentication server.

At event 723, the recorder computing device confirms successful configuration to use the second authentication server with the enterprise manager. At event 725, the administrator logs out of the enterprise manager. At event 726, once the recorder computing device successfully configures to use the second authentication server, a recorder manager and/or the enterprise manager transmit login information to the recorder computing device. At event 736, the recorder computing device provides authentication information associated with the login information to the second authentication server pursuant to the enterprise manager updating the authentication server. At event 739, the second authentication server validates the authentication information and transmits validation information associated with authentication information to the recorder computing device.

If the second authentication server cannot validate the authentication information due to, for example, malfunction of the second authentication server, the recorder computing device detects the malfunction status and automatically configures to use the first authentication server and transmits the authentication information to the first authentication server. Additionally or alternatively, the enterprise manager can detect and indicate to a user that the second authentication server has malfunctioned. The enterprise manager enables the users to manually revert to saved settings of the first authentication server as mentioned above. Because the authentication process between the recorder computing device and the first authentication server had been successful before, the first authentication server should validate the authentication information associated with the login information. Either after event 733 or event 739, the recorder computing device confirms successful login with the enterprise manager as shown at event 741. An advantage, among others, is that this method provides two chances for the recorder computing device to authenticate the login information of the user, either at the second authentication server or the first authentication server, which potentially assures that the authentication process is successful. In other words, the method can prevent administrators from locking themselves out of the system.

It should be noted that the enterprise manager enables the user to monitor the authentication servers that have been successfully (or unsuccessfully) configured with the corresponding recorder computing device. That is, the enterprise manager can provide a list of authentication servers along with status information indicating whether the authentication servers have been successfully (or unsuccessfully) configured with the corresponding recorder computing device. Another advantage, among others, is that this method can provide an enterprise manager upgrade path that does not require having to physically go around to each recorder and manually update the recorder configuration.

Additionally or alternatively, the enterprise manager and the first authentication server are integrated in a first computing system, and the second authentication server and a second enterprise manager are integrated in a second computing system. After the recorder computing device has been reconfigured to communicate with the second computing system, the administrator can immediately use the second enterprise manager without having any downtime of the system for updating the recorder configuration.

Figure 8:
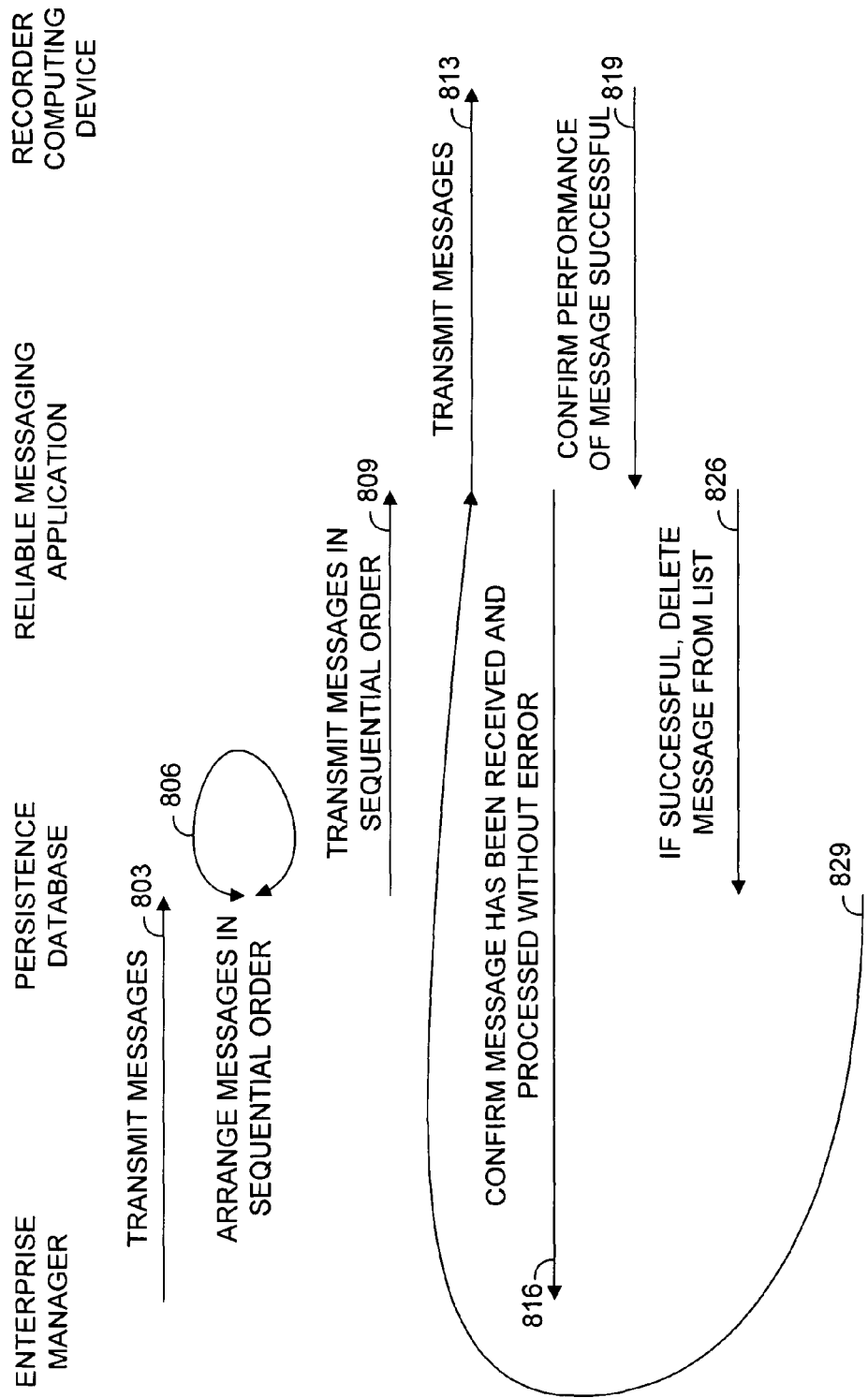
FIG. 8 is a sequence diagram of an embodiment of a system, such as shown in FIG. 2, in which reliable messaging between a central application module and a recorder computing device is achieved.

FIG. 8 is a sequence diagram of an embodiment of a system, such as shown in FIG. 2, in which reliable messaging between a central application module and recorder computing device is achieved. Beginning with event 803, an enterprise manager transmits messages to a persistence database. The messages can include, but are not limited to, instructions, such as instructions for changing an extension on the recorder and changing a configuration of the recorder, for example.

The persistence database arranges and transmits the messages in sequential order to a reliable messaging application at events 806 and 809, respectively. Some messages are performed in sequential order so that intended tasks associated with the messages can be achieved. For example, a first task has three messages A, B, and C and a second task has four messages D, E, F, and G that are arranged in first and second sequential orders, respectively. The first and second tasks are achieved by completing the messages A, B, C, D, E, F, and G in sequential order. If instructions associated with the message A of the first task are performed and instructions associated with the message B of the first task cannot be performed, then the first task can not be achieved. If such happens, the persistence database stops transmitting the messages for the first task and begins to transmit the messages of the second task. The persistence database resumes transmitting the messages of the first and second tasks if the tasks are not achieved. The persistence database assures that the messages of the intended tasks are performed in blocks so that the associated tasks can be achieved.

The reliable messaging application transmits the messages to the recorder computing message at event 813. At event 816, the reliable messaging application provides status of the messages indicating whether the reliable messaging application transmitted the messages. For example, the status of the message could confirm that the message has been received and processed without error. At event 819, the recorder computing device receives the messages and confirms that performance of the messages was successful (or unsuccessful). At event 826, if the recorder computing device receives and performs the messages successfully, then the reliable messaging application communicates with the persistence database to delete the performed messages from the database. If the recorder computing device does not perform the messages successfully, the sequence returns to 809 in which the persistence database transmits the messages in sequential order, as indicated at event 829. An advantage, among others, of the reliable messaging operation is that the message can be performed even when the enterprise manager malfunctions. The reliable messaging application will continue to send the message until the message is successfully processed or deleted from the system by the user. Alternatively or additionally, the reliable messaging application can repeat transmitting of the messages for a certain number of times, e.g., 25 times. After the certain number of times, the reliable messaging application stops transmitting the messages and notifies the user via the display device 287 that the messages cannot be achieved.

Before a user can be assigned their roles within a call center premises, an administrator can create or edit sites, site groups, and users using the enterprise manager. Creating sites and site groups allows administrators to organize recorders according to their geographical or business needs. The administrator can assign the users privileges to access software installation configurations that are restricted to a sub-hierarchy of the enterprise manager. Privileges may also be restricted at the site group or site level. Site groups are collections of sites in the enterprise hierarchy that facilitate the administration and security for installed recorders. The display diagrams of FIGS. 10-14 illustrate examples of how the administrators create or edit sites, site groups, and users, and view alarms from recorders.

Figure 9:
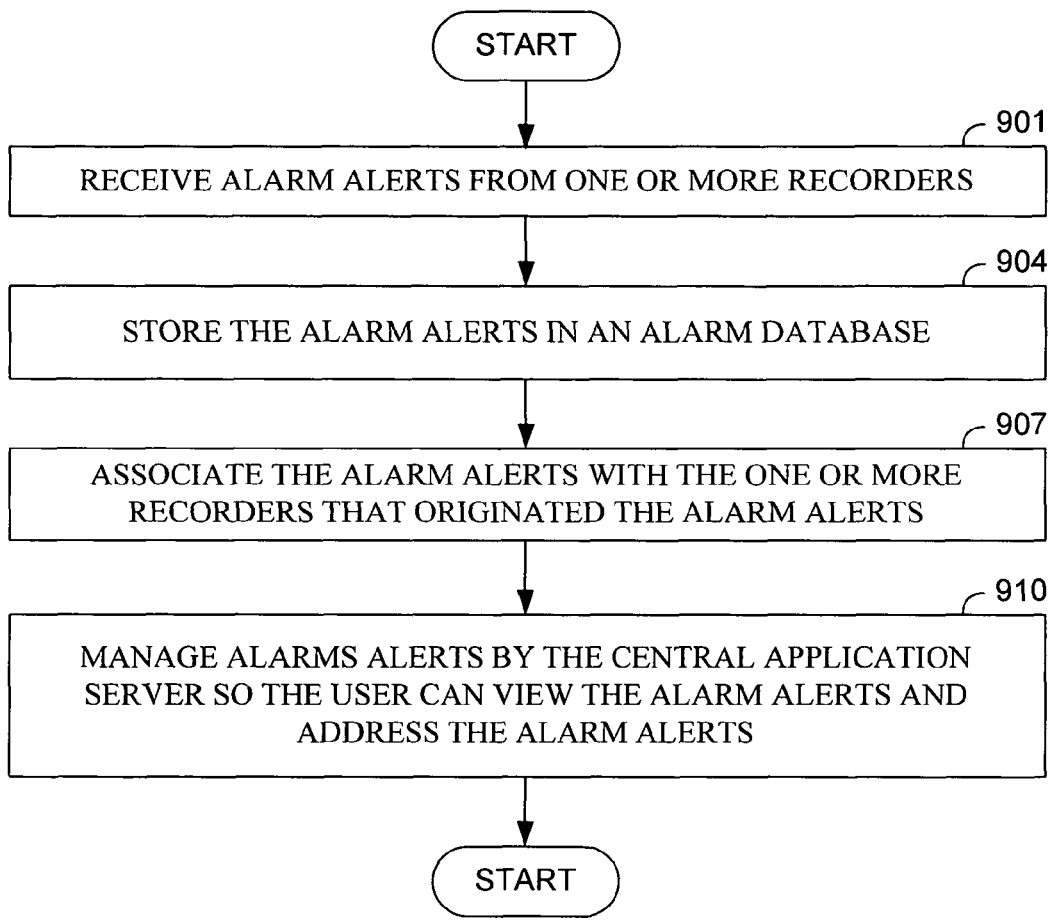
FIG. 9 is a flow diagram that illustrates operation of an embodiment of an enterprise manager that manages alarms from recorders in a call center premises.

FIG. 9 is a flow diagram that illustrates operation of an embodiment of an enterprise manager that manages alarms from recorders. Beginning with block 901, the enterprise manager receives alarm alerts from the recorders and in block 904, stores the alarm alerts in an alarm database (not shown). In block 907, the received alarm alerts are associated with the recorders that originated the alarm alerts. In block 910, the enterprise manager manages the alarm alerts so the user can view the alarm alerts and address the alarm alerts. In particular, the enterprise manager utilizes a hierarchy list to show alarm statuses at any point within that hierarchy. A user may be able to easily and quickly advance (that is, drill down) to the recorder of interest responsive to receiving an alarm alert and take any necessary corrective action, such as reset the recorder or clear the alarms. The user can even review the various alarms, such as when the alarms were last triggered and how many alarms of that type have occurred. It should be mentioned that the corrective action can be performed if the user has access rights to the recorders, as mentioned above in relation to FIG. 6.

Figure 10:
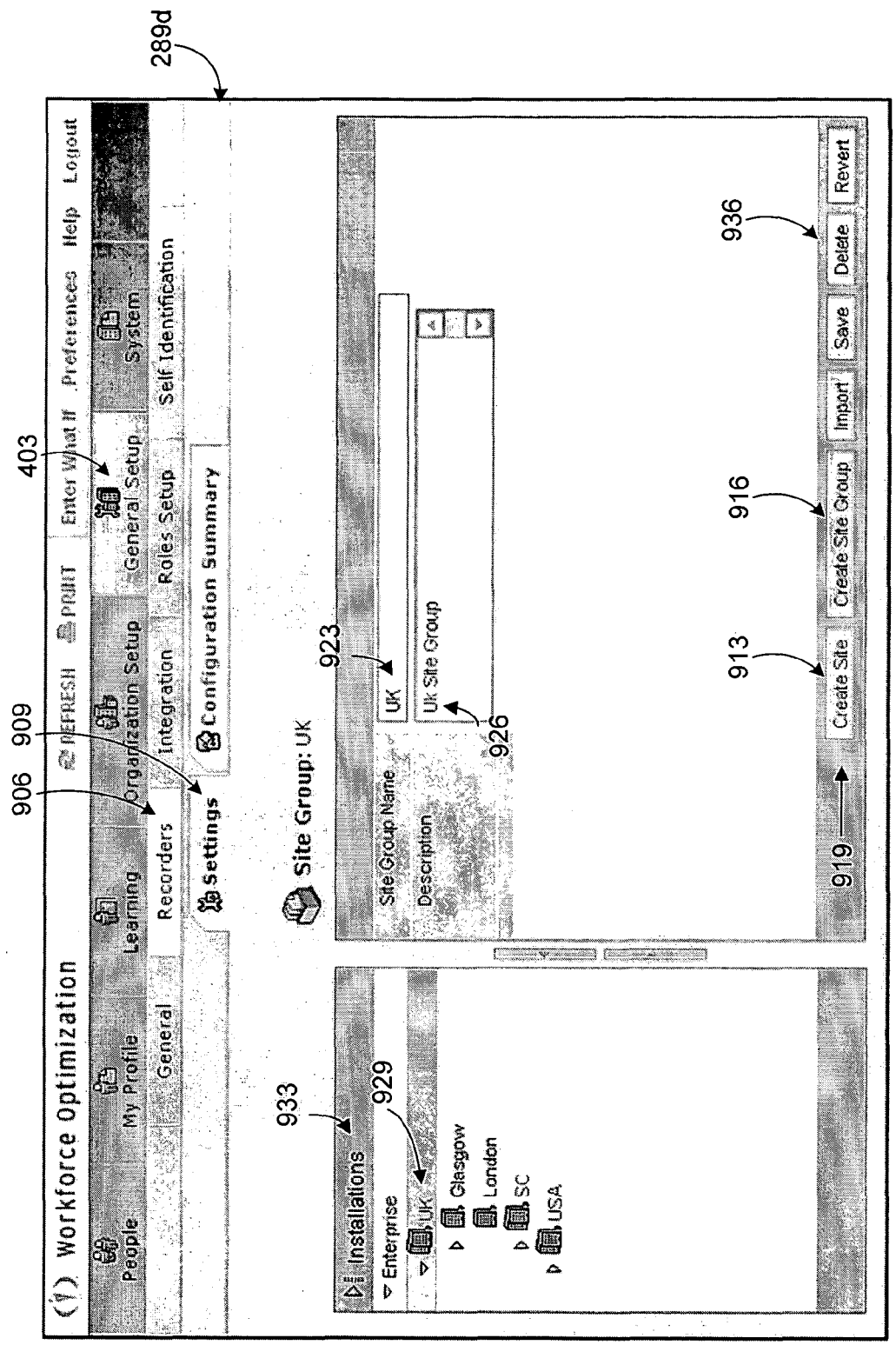
FIG. 10 is an exemplary display diagram from the display device of a central application module, such as shown in FIG. 2, that illustrates a graphical user interface for creating and editing site groups that can be viewed in an enterprise manager.

FIG. 10 is an exemplary display diagram from the display device of the central application module, such as shown in FIG. 2, that illustrates a graphical user interface for creating and editing site groups that can be viewed in an enterprise manager. Display diagram 289*d* appears by selecting file menu "General Setup" 403, "Recorders" option 906 and "Settings" folder 909. An administrator can create a site group by selecting "Create Site Group" option 916 of action features 919. In FIG. 9, for example, the administrator selected option 916 to create a UK site group 923 with description 926. Once the UK site group is created, the administrator can edit the UK site group information by selecting the UK site group icon 929 in installations hierarchy section 933 and change the name and description of the UK site group. The administrator can also delete the site group by selecting the UK site group icon 929 and click on option "Delete" 936 of action features 919.

Figure 11:
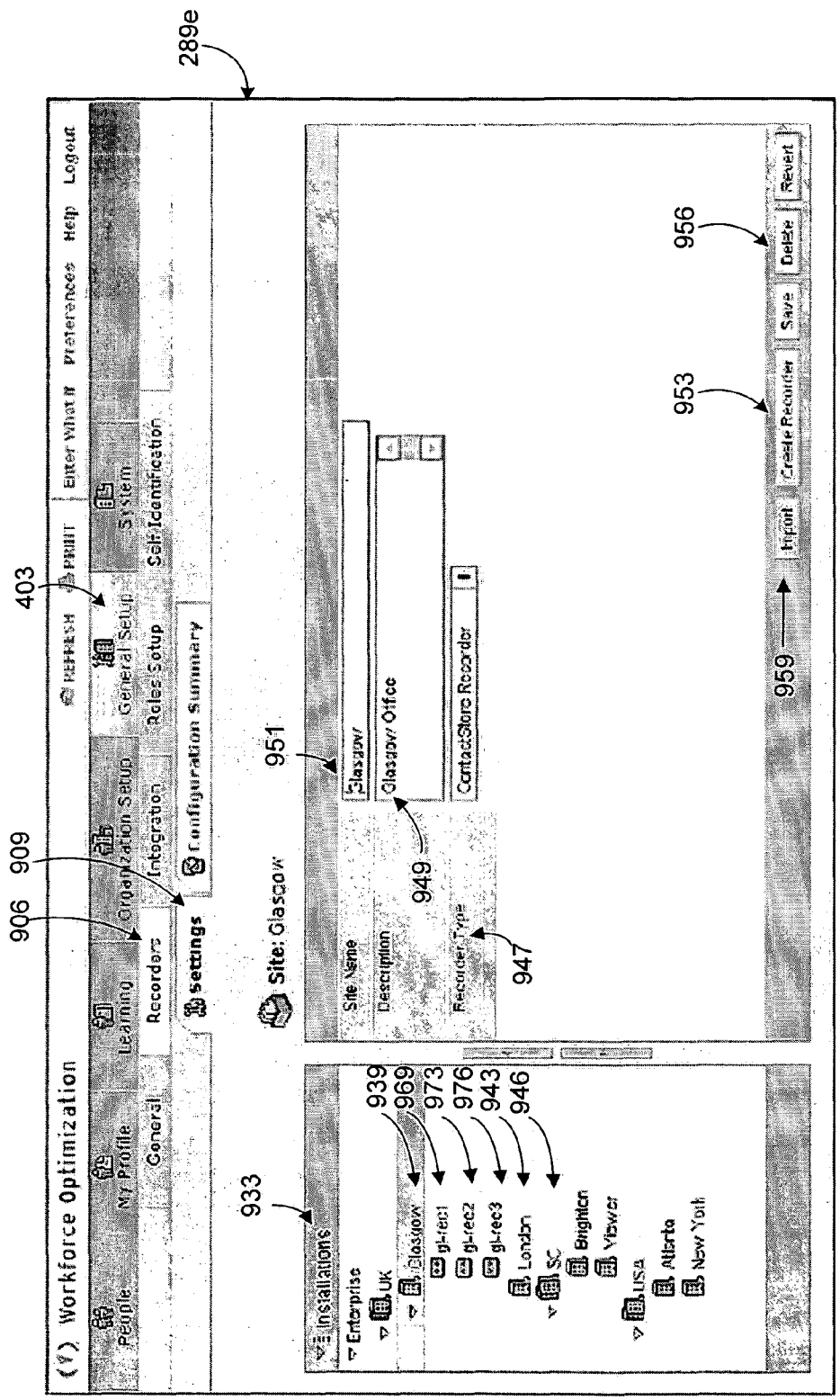
FIG. 11 is an exemplary display diagram from the display device of a central application module, such as shown in FIG. 2, that illustrates a graphical user interface for creating and editing sites within site groups, such as shown in FIG. 10.

FIG. 11 is an exemplary display diagram from the display device of a central application module, such as shown in FIG. 2, that illustrates a graphical user interface for creating and editing sites within site groups, such as shown in FIG. 10. Once the administrator has created the site groups, the administrator can create sites with the site group. For example, by selecting the UK site group icon 929 and option "Create Site" 913 of action features 919 in FIG. 10, the administrator can create sites representing cities, such as Glasgow 939, London 943, and SC 946, within the UK site group 929, as shown in display diagram 289*e*. The administrator can edit the sites information by selecting the sites icons 939, 943, 946 in the installations hierarchy section 933 and change the recorder type 947, name 951 and description 949 of the sites. The administrator can also delete the sites by selecting the sites 939, 943, 946 and click on option "Delete" 956 of action features 959.

Figure 12:
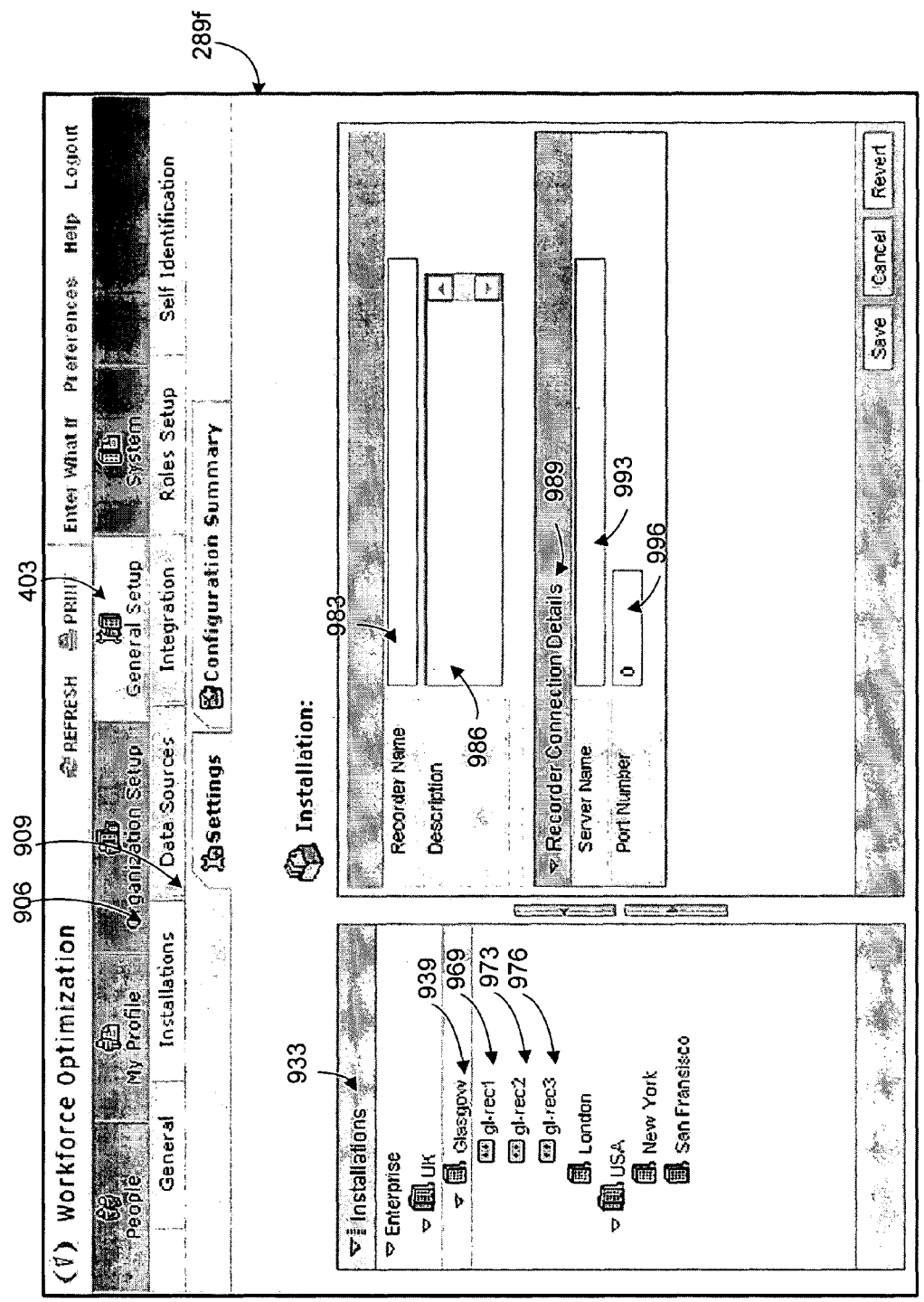
FIG. 12 is an exemplary display diagram from the display device of a central application module, such as shown in FIG. 2, that illustrates a graphical user interface for creating and importing recorders to sites, such as shown in FIG. 11.

FIG. 12 is an exemplary display diagram from the display device of a central application module, such as shown in FIG. 2, that illustrates a graphical user interface for creating and importing recorders to sites, such as shown in FIG. 11. Once the administrator has created the sites, the administrator can create and import recorders to the sites. For example, by selecting the Glasgow icon 939 and "Create Recorder" option 953 of action features 959 in FIG. 11, the administrator can create and import recorders, such as GL-REC1 969, GL-REC2 973, and GL-REC3 976, within the Glasgow site 939, as shown in display diagram 289*f*. The administrator can edit the recorder information by selecting the recorder icons 969, 973, 976 in the installations hierarchy section 933 and change the name 983 and description 986 of the recorder. The administrator can further change the recorder connection details 989, in particular, server name 993 and port number 996 of the recorder. Referring now to FIG. 11, the recorders can be deleted from the installations hierarchy section 933 by selecting the recorders icons 969, 973, 976 and clicking on option "Delete" 956 of action features 959.

Figure 13:
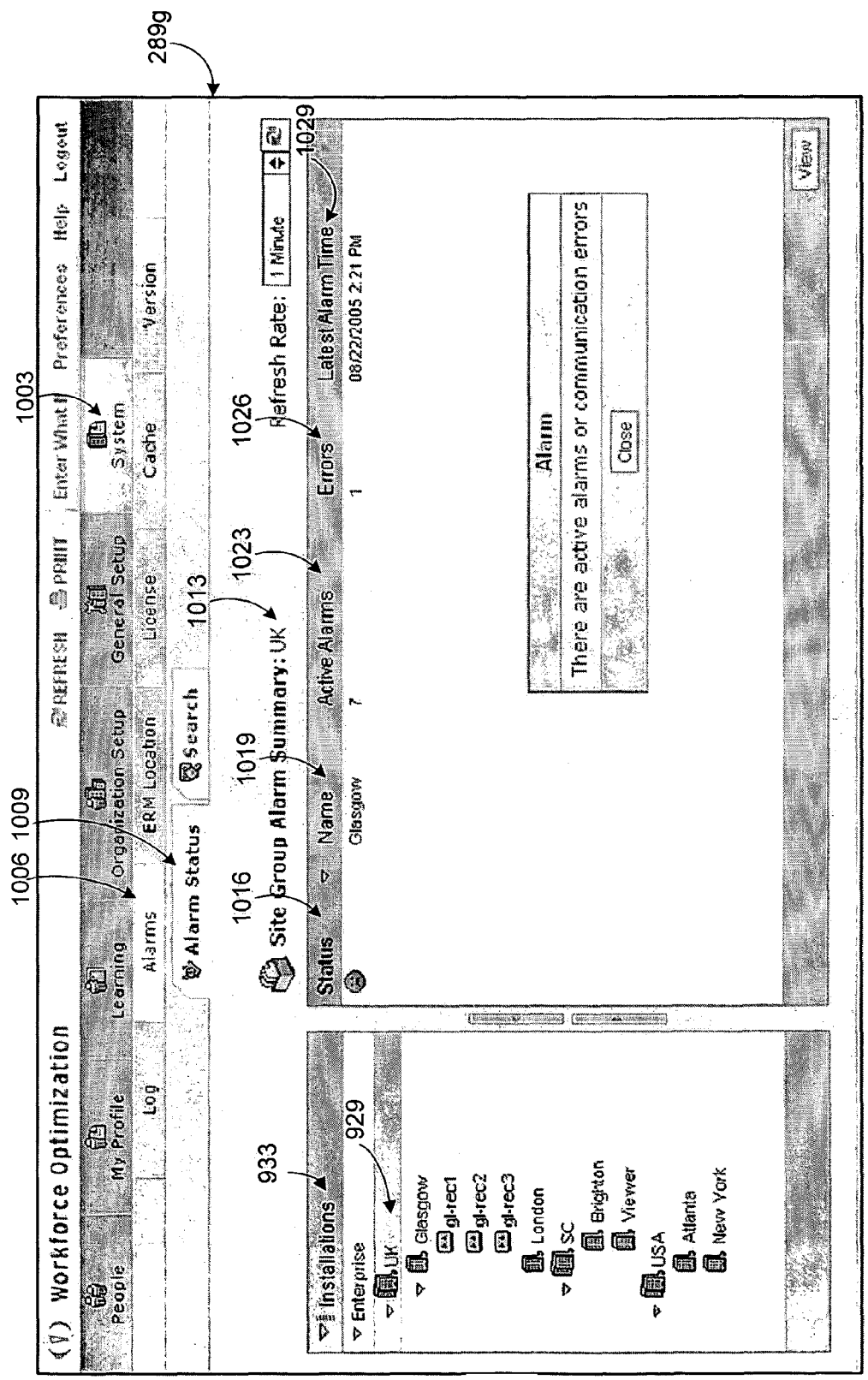
FIG. 13 is an exemplary display diagram from the display device of a central application module, such as shown in FIG. 2, that illustrates a graphical user interface for viewing recorder alarms in a site group, such as shown in FIG. 10.

FIG. 13 is an exemplary display diagram from the display device of a central application module, such as shown in FIG. 2, that illustrates a graphical user interface for viewing recorder alarms in a site group, such as shown in FIG. 10. Display diagram 289*g* appears by selecting file menu "System" 1003, "Alarms" option 1006 and "Alarm Status" folder 1009. An administrator can select any of the site groups to display alarms associated with recorders assigned to the selected site group, as shown in Alarm Summary section 1013. For example, the administrator selected the UK site group 929 and the enterprise manager displays the alarm summary 1013 for the UK site group, which includes status indicia 1016, the Glasgow site name 1019, seven active alarms 1023, one error 1026, and the latest alarm time 1029 (e.g., Aug. 22, 2005 at 2:21 PM). Status indicia 1016 shows the status of alarms by color (red, grey and green), with red (unhappy face) indicating an active alarm or a communication error requiring attention, green (happy face) indicating no active alarms or errors, and grey indicating that the recorder's status has not been updated. The active alarms 1023 show the total number of active alarms from recorders in the displayed site group or site. The errors 1026 show the number of recorders with which the enterprise manager cannot communicate. The name 1019 indicates the sites regarding which the alarm had been triggered.

Figure 14:
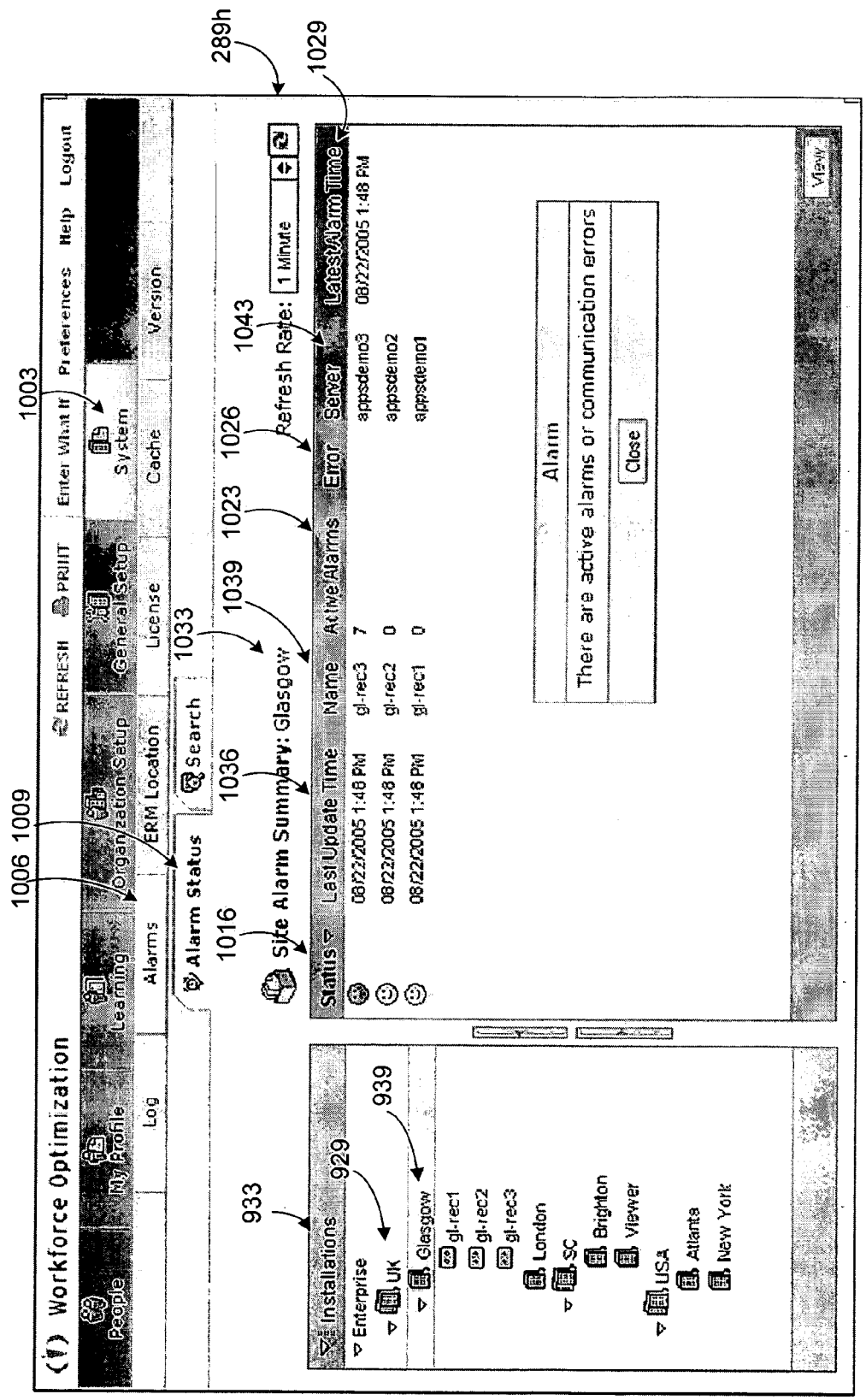
FIG. 14 is an exemplary display diagram from the display device of a central application module, such as shown in FIG. 2, that illustrates a graphical user interface for viewing recorder alarms in sites, such as shown in FIG. 11.

FIG. 14 is an exemplary display diagram from the display device of a central application module, such as shown in FIG. 2, that illustrates a graphical user interface for viewing recorder alarms in sites, such as shown in FIG. 11. Display diagram 289*h* appears by selecting on any sites in the installations hierarchy section 933 in FIG. 13 to display alarms associated with recorders assigned to the sites, as shown in Alarm Summary section 1033. For example, by selecting the Glasgow site 939 in FIG. 13, the alarm summary 1033 for the Glasgow site is displayed and includes: a status indicia 1016, the names of the recorders 1033 assigned to the Glasgow site 939, active alarms 1023 that include seven alarms from a recorder, zero error 1026, the name 1043 of the recorder computing device on which the alarm had been triggered, the latest alarm time 1029 (e.g., Aug. 22, 2005 at 1:48 PM), and the latest update time 1036 (e.g., Aug. 22, 2005 at 1:48 PM). Additionally or alternatively, a user can be notified by sending an email or any notification mechanism when an alarm event exists.

Each alarm can have different email profiles associated with it. Such email profiles can be used to indicate that an alarm notification is to be sent to an individual or group that is interested in that event. For example, a user who is managing an archive system might get notifications of events that are appropriate to that role. Each individual recorder manages the e-mailing of notification alerts and hence the profiles of each recorder can be different if so desired.

Figure 15:
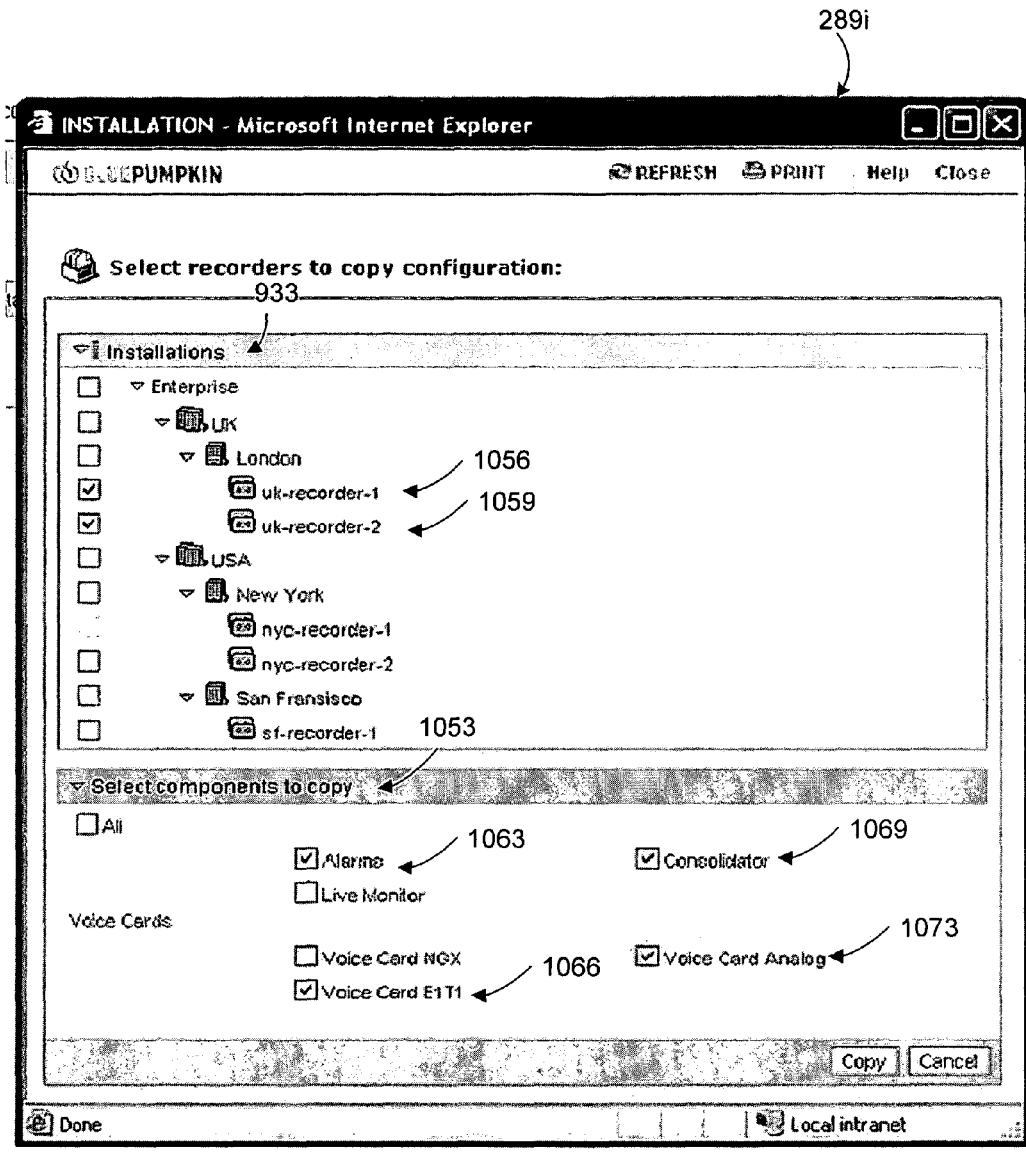
FIG. 15 is an exemplary display diagram from the display device of a central application module, such as shown in FIG. 2, that illustrates a graphical user interface for copying settings of one recorder to another recorder.

FIG. 15 is an exemplary display diagram from the display device of a central application module, such as shown in FIG. 2, that illustrates a graphical user interface for copying settings of one recorder to another recorder. The enterprise manager allows for copying of settings of one recorder to another recorder, such as shown in display diagram 289*i*. The user can select a configured recorder in the installations hierarchy section 933, such as uk-recorder-1 1056 and uk-recorder-2 1059. The user can further select components of the selected recorder to be copied in "Select components to copy" section 1053. For instance, the user has selected the following components to be copied: alarms 1063, consolidator 1069, voice card E1T1 1066 and voice card analog 1073. Once the configurations of the selected recorders have been copied, the user can select the recorders to receive the copied configuration.

In other words, configuration and key parameter data can be copied from one source recording system to one or more target recording systems. The source data may be selected from a list of key functional areas, such as in the "Selected components to copy" section 1053. The configuration data is then applied to the target recorders in such a way as to update the configuration of the functional areas selected. Any data that is unique to a given recording system is maintained with only the non-unique data being updated. The source and target recording systems do not need to be identical in their capabilities. The configuration data will be applied to any available instances of the functional area to be configured on the target systems.

An advantage, among others, of this copying method is that a copy of the recorders configuration does not have to include all available components but selected components, as mentioned above. Another advantage, among others, is that the source recording systems may have different physical configurations than the target. Those components that are the same can be copied from the source recording system to the target recording system. Another advantage, among others, is that, in the case of functions where there may be multiple instances in the source recorder, the first in the configuration list is used.

Another advantage, among others, is where there are multiple instances of a feature to be configured in the source recorder, then all instances can be applied with the configuration data. For example, the configuration data from the first analog card in the source recorder can be applied to the 15 cards in the target recorder. Another advantage, among others, is that non-unique data can be copied to the source system, such as Card ID or Serial numbers. Another advantage, among others, is that the configuration copy is delivered through the guaranteed delivery process within the enterprise manager. Another advantage, among others, is that the status of the configuration copy and any failures are reported.

The enterprise manager allows an administrator to organize other recording assets under sites. A site is defined as a logical collection of remote components, while a site group is defined as a logical collection of sites. The enterprise manager can integrate other remote components spread across the enterprise such as an Audio Server, Central Archive Manager, Multimedia Server & BDR Server.

Additionally or alternatively, the enterprise manager enables a user to install one or more audio servers to a site and/or site group level, which allows an application layer to determine the location of the audio server for load balancing and proximity determination purposes. Additionally or alternatively, the enterprise manager enables an administrator to install one or more central archive manager (CAM) servers at a site and/or site group level, which allows the administrator to determine which recorders are associated with which CAM Server. This flexibility allows a company to distribute the load of archiving across multiple recorders on different servers. Each CAM server can run its own archival campaigns, which can be independent from CAM Servers.

Additionally or alternatively, a multimedia Post-processing (MMP) server can be configured on a specific recorder or installed on a separate server. The MMP server is capable of stitching contents recorded on different recorders, and converting the encoding of the recorded calls, for example. The enterprise manager allows registration of one or more MMP servers at a site and/or site group level. This allows an application layer to perform load balancing and perform least cost routing. Additionally or alternatively, multiple business device recorder (BDR) servers can be registered at a site and/or a site group level. Hence, to represent the relationship between the recorders and BDR servers, the enterprise manager can represent a topology between the recorders and BDR Servers.

It should be noted that the any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method for managing alarms from recorders, comprising the steps of:
    organizing the recorders into a hierarchical view by geographic locations, wherein the recorders are distributed over multiple geographic locations;
    receiving alarm alerts from one or more recorders by a central application module, the alarm alerts being operative to notify a user of a problem associated with the functionality of one or more recorders;
    storing the alarm alerts in an alarm database;
    managing the alarm alerts by the central application module so that a user can view the alarm alerts by navigating the hierarchical view of recorders; and
    copying configuration and parameters from a source recorder associated with a first alarm alert to a target recorder, the configuration and parameters being applied to the target recorder to update predetermined functional areas of the target recorder.

2. The method as defined in claim 1, further comprising assigning the one or more recorders to site groups and sites.

3. The method as defined in claim 2, further comprising associating the alarm alerts with the one or more recorders that originated the alarm alerts and associating the alarm alerts with the site groups and sites.

4. The method as defined in claim 3, further comprising displaying information corresponding to the site groups, sites, alarm alerts, and one or more recorders on a display device that enables a user to review an alarm alert of interest and take any corrective action.

5. The method as defined in claim 1, further comprising including one or more audio servers at one of a site and site group level, which allows an application layer to determine the location of the audio server for load balancing and proximity determination purposes.

6. The system as defined in claim 1, further comprising including one or more central archive manager (CAM) servers at one of a site and site group level, which allows the user to determine which recorders are associated with which CAM Server.

7. The method as defined in claim 1, wherein the receiving, storing and managing alarm steps are embedded as services within a network.

8. A system for managing alarms from recorders, comprising:
organizing the recorders into a hierarchical view by geographic locations, wherein the recorders are distributed over multiple geographic locations;
one or more recorders operative to provide alarm alerts for notifying a user of a problem associated with the functionality of the one or more recorders;
one or more recorder computing devices that communicate with the one or more recorders, each of the recorder computing devices receiving the alarm alerts from a corresponding one of the one or more recorders; and
a central application module that communicates with the one or more recorder computing devices, the central application module being operative to receive and manage alarm alerts from the one or more recorders so that a user can view the alarm alerts by navigating the hierarchical view of recorders, the central application module further copying configuration and parameters from a source recorder associated with a first alarm alert to a target recorder, the configuration and parameters being applied to the target recorder to update predetermined functional areas of the target recorder.

9. The system as defined in claim 8, further comprising an alarm database that stores the alarm alerts and associates the alarm alerts with originating recorders.

10. The system as defined in claim 9, wherein the central application module is operative to manage sites and site groups, the central application module being operative to assign the one or more recorders to one of the sites and site groups.

11. The system as defined in claim 10, wherein the central application module is operative to associate the alarm alerts with the sites and site groups.

12. The system as defined in claim 11, wherein the central application module is operative to display the site groups, sites, alarm alerts, and one or more recorders on a display device that enables a user to review an alarm alert of interest.

13. The system as defined in claim 8, wherein the central application module enables a user to include one or more audio servers at one of a site and site group level, which allows an application layer to determine the location of the audio server to go to for load balancing and proximity determination purposes.

14. The system as defined in claim 8, wherein the central application module enables a user to include one or more central archive manager (CAM) servers at one of a site and site group level, which allows the user to determine which recorders consolidate to which CAM Server.

15. A system for managing alarms from recorders in a call center premises, comprising:
organizing the recorders into a hierarchical view by geographic locations, wherein the recorders are distributed over multiple geographic locations;
one or more recorders operative to provide alarm alerts for notifying a user of a problem associated with the functionality of the one or more recorders;
one or more recorder computing devices that communicate with the one or more recorders, each of the recorder computing devices receiving the alarm alerts from a corresponding one of the one or more recorders; and
a central application module that communicates with the one or more recorder computing devices,
wherein the central application module is operative to receive and manage alarm alerts from the one or more recorders so that a user can view the alarm alerts by navigating the hierarchical view of recorders,
wherein the central application module is embedded as service on the network, and
wherein the central application copies configuration and parameters from a source recorder associated with a first alarm alert to a target recorder, the configuration and parameters being applied to the target recorder to update predetermined functional areas of the target recorder.

16. The system as defined in claim 15, wherein the central application module is operative to manage sites and site groups, the central application module being operative to assign the one or more recorders to the sites and site groups.

17. The system as defined in claim 16, wherein the central application module is operative to associate the alarm alerts with the one or more recorders that originated the alarm alerts, the central application module being operative to associate the alarm alerts with the site groups and sites.

18. The system as defined in claim 17, wherein the central application module is operative to display information corresponding to the site groups, sites, alarm alerts, and one or more recorders on a display device that enables a user to review an alarm alert of interest, and
wherein the central application module uses a hierarchy list for the site groups, sites, alarm alerts, and one or more recorders to show alarm statuses at any point within that hierarchy.

* * * * *